(12) United States Patent
Masuda

(10) Patent No.: US 10,031,226 B2
(45) Date of Patent: Jul. 24, 2018

(54) ULTRASONIC MEASUREMENT APPARATUS, ULTRASONIC DIAGNOSTIC APPARATUS, AND ULTRASONIC MEASUREMENT METHOD

(71) Applicant: Seiko Epson Corporation, Tokyo (JP)

(72) Inventor: Hiroyuki Masuda, Chino (JP)

(73) Assignee: Seiko Epson Corporation (JP)

( * ) Notice: Subject to any disclaimer, the term of this patent is extended or adjusted under 35 U.S.C. 154(b) by 453 days.

(21) Appl. No.: 14/926,739

(22) Filed: Oct. 29, 2015

(65) Prior Publication Data

US 2016/0124088 A1 May 5, 2016

(30) Foreign Application Priority Data

Oct. 30, 2014 (JP) ................. 2014-221047

(51) Int. Cl.
  *G03B 42/06* (2006.01)
  *G01S 15/89* (2006.01)
  *G01S 7/52* (2006.01)
(52) U.S. Cl.
  CPC ...... *G01S 15/8915* (2013.01); *G01S 7/52046* (2013.01); *G01S 15/8913* (2013.01)
(58) Field of Classification Search
  USPC ............................................... 367/7
  See application file for complete search history.

(56) References Cited

U.S. PATENT DOCUMENTS 4,262,344 A * 4/1981 Gilmour ............ G01S 15/8902
  367/103

4,413,332 A * 11/1983 Gilmour .............. G10K 11/346
  367/122

(Continued)

FOREIGN PATENT DOCUMENTS

JP 2003-220059 A 8/2003
JP 2009-219876 A 10/2009

OTHER PUBLICATIONS

Ryan, James G. "Criterion for the minimum source distance at which plane-wave beamforming can be applied." The Journal of the Acoustical Society of America 104.1 (1998): 595-598.*

(Continued)

*Primary Examiner* — Isam A Alsomiri
*Assistant Examiner* — Jonathan D Armstrong
(74) *Attorney, Agent, or Firm* — Harness, Dickey & Pierce, P.L.C.

(57) ABSTRACT

An ultrasonic measurement apparatus includes a transmission processing unit that performs processing for transmitting an ultrasonic wave at a given transmission angle, a reception processing unit that performs reception processing of an ultrasonic echo with respect to the transmitted ultrasonic wave in first to Nth (N is an integer equal to or greater than 2) ultrasonic transducers; and a processing unit that performs processing with respect to first to Nth reception signals corresponding to the first to Nth ultrasonic transducers. The processing unit performs first phasing processing when a signal processing target point exists in a plane wave propagation region, and performs second phasing processing when the signal processing target point exists in a spherical wave propagation region, as phasing processing with respect to each of the reception signals of the first to Nth reception signals.

19 Claims, 19 Drawing Sheets

(56) References Cited

U.S. PATENT DOCUMENTS

| | | | | |
|---|---|---|---|---|
| 9,622,724 | B2* | 4/2017 | Samset | A61B 8/5207 |
| 2009/0234230 | A1 | 9/2009 | Bercoff et al. | |
| 2013/0046175 | A1* | 2/2013 | Sumi | A61B 8/08 |
| | | | | 600/431 |
| 2014/0334266 | A1* | 11/2014 | Cogan | G01S 15/8927 |
| | | | | 367/138 |
| 2015/0272549 | A1* | 10/2015 | Samset | G01S 7/52036 |
| | | | | 600/443 |
| 2016/0124082 | A1* | 5/2016 | Masuda | G01S 7/52046 |
| | | | | 367/87 |
| 2016/0124088 | A1* | 5/2016 | Masuda | G01S 7/52046 |
| | | | | 367/7 |
| 2016/0157828 | A1* | 6/2016 | Sumi | G01N 29/0654 |
| | | | | 702/189 |
| 2016/0213258 | A1* | 7/2016 | Lashkari | A61B 5/0095 |
| 2016/0296204 | A1* | 10/2016 | Park | A61B 8/4405 |
| 2017/0042510 | A1* | 2/2017 | Ikeda | A61B 8/14 |
| 2017/0071576 | A1* | 3/2017 | Du | A61B 8/00 |
| 2017/0086781 | A1* | 3/2017 | Bandaru | A61B 8/0841 |
| 2017/0188138 | A1* | 6/2017 | Makinen | H04R 1/326 |
| 2017/0367684 | A1* | 12/2017 | Foroozan | A61B 8/5207 |

OTHER PUBLICATIONS

G. Montaldo et al., "Coherent Plane-Wave Compounding for Very High Frame Rate Ultrasonography and Transient Elastography", IEEE Transactions on Ultrasonics, Ferroelectrics, and Frequency Control, vol. 56, No. 3, Mar. 2009, pp. 489-506.

* cited by examiner

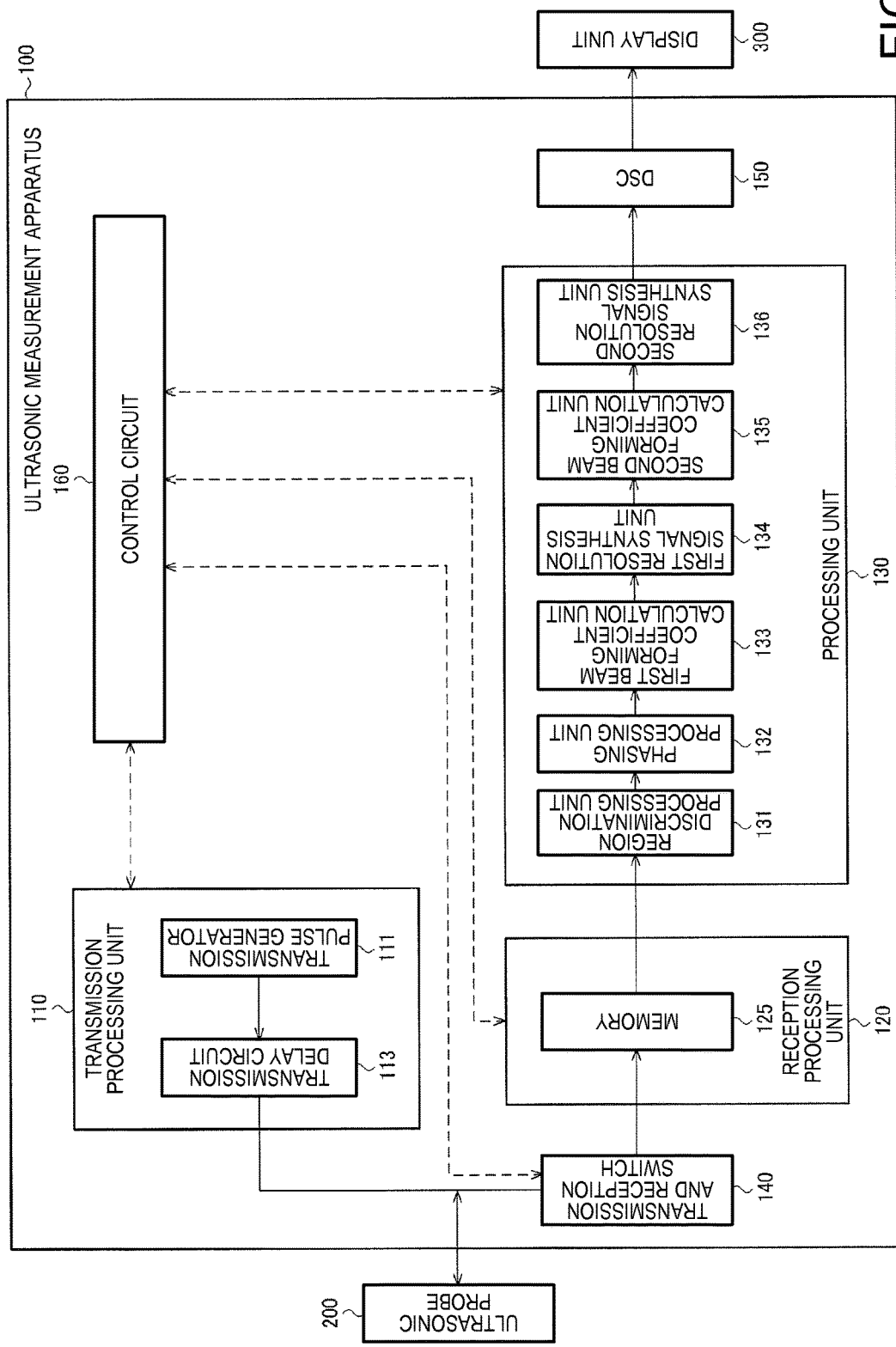

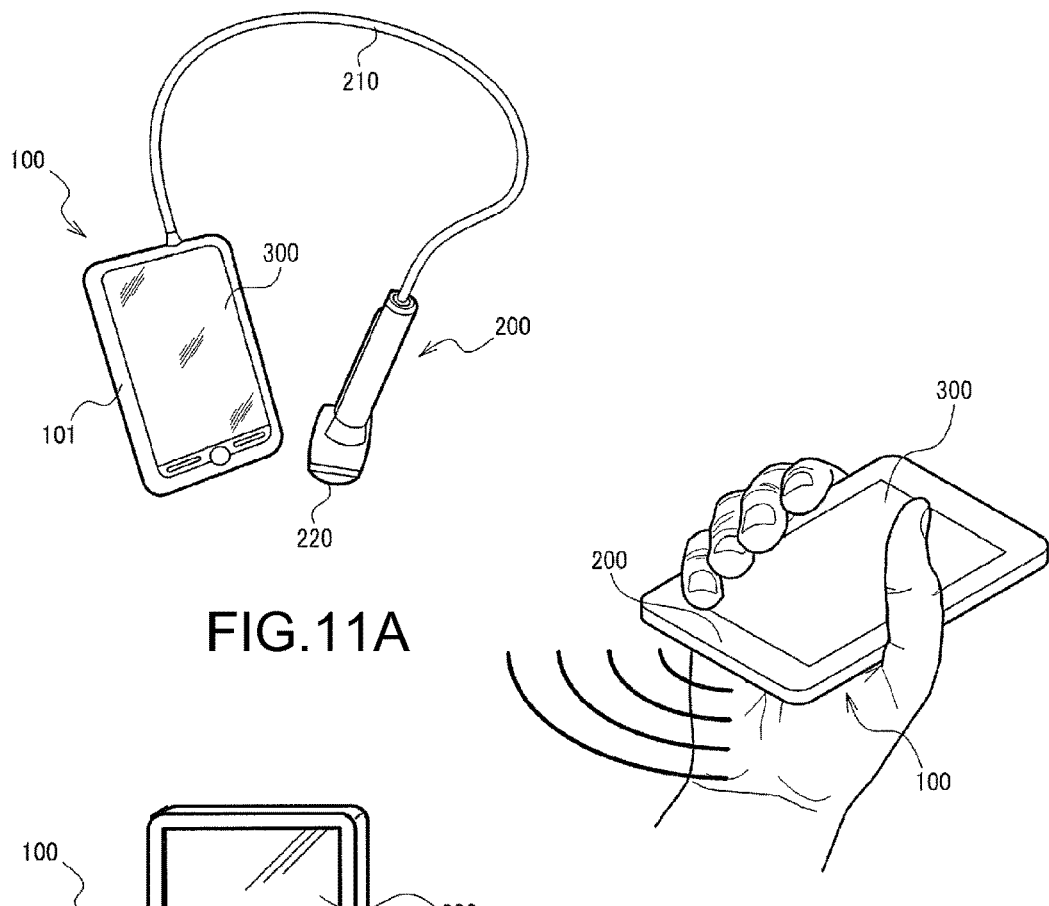
FIG.11A
FIG.11C
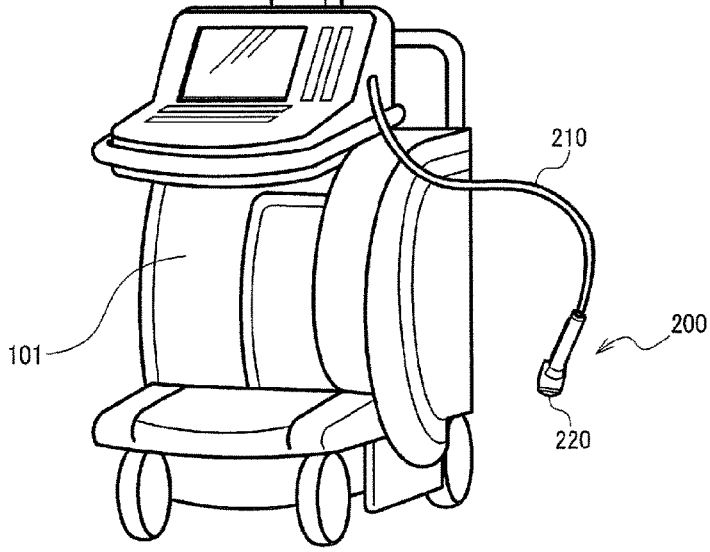
FIG.11B $r = r_p$

| TRANSMISSION NUMBER | 1 | 2 | 3 | ... | K |
|---|---|---|---|---|---|
| REGION DISCRIMINATION RESULT | 0 | 0 | 1 | ... | 0 |

FIG.17A

| MEASUREMENT POINT NUMBER \ TRANSMISSION NUMBER | 1 | 2 | 3 | ... | K |
|---|---|---|---|---|---|
| 1 | 0 | 0 | 1 | ... | 0 |
| 2 | 0 | 1 | 1 | ... | 0 |
| 3 | 0 | 0 | 0 | ... | 1 |
| ⋮ | 0 | 0 | 1 | ... | 1 |
| M | 0 | 0 | 0 | ... | 0 |

FIG.17B

ULTRASONIC MEASUREMENT APPARATUS, ULTRASONIC DIAGNOSTIC APPARATUS, AND ULTRASONIC MEASUREMENT METHOD

BACKGROUND

1. Technical Field

The present invention relates to an ultrasonic measurement apparatus, an ultrasonic diagnostic apparatus, an ultrasonic measurement method, and the like.

2. Related Art

In ultrasonic measurement apparatuses (ultrasonic diagnostic apparatuses), synthetic aperture processing in which focusing can be formed in overall region of an observation region is adopted thereto in order to obtain favorable resolution throughout a wide region in an ultrasonic image. According to the aforementioned technique, focusing can be formed with the fewer number of times of transmissions and receptions, and processing is performed so as to be able to attain a high frame rate and high resolution.

Among methods of the synthetic aperture processing, there is known technique in which plane waves are used as transmission waves. For example, JP-A-2003-220059 discloses technique of performing the synthetic aperture processing in consideration of diffraction characteristics of ultrasonic waves while using the plane waves as transmission waves. Gabriel Montaldo, "Coherent Plane-Wave Compounding for Very High Frame Rate Ultrasonography and Transient Elastography", IEEE Transactions on Ultrasonics, Ferroelectrics, and Frequency Control, vol. 56, no. 3, 2009. (hereinafter, referred to as Non Patent Literature 1) discloses technique of acquiring resolution equivalent to that in multistage-focus processing which is known as technique in the related art being different from the synthetic aperture processing, and realizing a high frame rate. Specifically, according to Non Patent Literature 1, the synthetic aperture processing is performed by transmitting plane waves which do not allow focusing of a beam, thereby realizing resolution equivalent to that in the multistage-focus processing in the related art with the fewer number of times of transmissions.

As disclosed in Non Patent Literature 1, it is possible to acquire an ultrasonic image having equivalent resolution compared to that of technique in which the plane waves are not used, with the fewer number of times of transmissions by using plane waves as transmission waves. However, when transmitting a plane wave from an element array (an ultrasonic transducer element array), the plane wave is transmitted to a predetermined region, but a wave other than the plane wave (for example, a spherical wave) is transmitted to other regions.

According to the technique disclosed in Non Patent Literature 1, it is not possible to capture a signal of a wave other than the plane wave. Therefore, an aperture width effective for transmission becomes small in the technique, thereby leading to a disadvantage in that resolution of an obtained image is degraded as a result thereof.

SUMMARY

An advantage of some aspects of the invention is to provide an ultrasonic measurement apparatus, an ultrasonic diagnostic apparatus, and an ultrasonic measurement method in which resolution of an obtained signal (image) can be improved by performing phasing processing which varies in accordance with whether a signal processing target point exists in a plane wave propagation region or a spherical wave propagation region.

An aspect of the invention relates to an ultrasonic measurement apparatus including a transmission processing unit that performs processing for transmitting an ultrasonic wave at a given transmission angle, a reception processing unit that performs reception processing of an ultrasonic echo with respect to the transmitted ultrasonic wave in first to Nth (N is an integer equal to or greater than 2) ultrasonic transducers, and a processing unit that performs processing with respect to first to Nth reception signals corresponding to the first to Nth ultrasonic transducers. The processing unit performs phasing processing with respect to each of the reception signals of the first to Nth reception signals, such as first phasing processing performed when a signal processing target point exists in a plane wave propagation region in which the ultrasonic wave is propagated as a plane wave, and second phasing processing performed when the signal processing target point exists in a spherical wave propagation region in which the ultrasonic wave is propagated as a spherical wave.

According to the aspect of the invention, the phasing processing is changed in accordance with whether the signal processing target point exists in the plane wave propagation region or exists in the spherical wave propagation region. Even when the plane wave is transmitted, a region having the spherical wave propagated is generated. However, since information corresponding to the spherical wave propagation region can also be suitably utilized in generation processing of an output signal, it is possible to improve resolution of a signal (an image).

In the aspect of the invention, the plane wave propagation region and the spherical wave propagation region may be regions different from each other in accordance with the transmission angle of the ultrasonic wave in the transmission processing unit.

With this configuration, it is possible to decide the plane wave propagation region and the spherical wave propagation region in accordance with the transmission angle of an ultrasonic wave.

In the aspect of the invention, the first phasing processing may be phasing processing performed for a plane wave propagation time which is obtained by a plane wave propagation model. The second phasing processing may be phasing processing performed for a spherical wave propagation time which is obtained by a spherical wave propagation model.

With this configuration, it is possible to perform the variable phasing processing by using the plane wave propagation model or the spherical wave propagation model.

In the aspect of the invention, the processing unit may perform region discrimination processing regarding where the signal processing target point exists in any one of the plane wave propagation region and the spherical wave propagation region.

With this configuration, it is possible to perform the region discrimination processing.

In the aspect of the invention, the ultrasonic measurement apparatus may further include a storage unit that stores table data in which information indicating where the signal processing target point exists in any one of the plane wave propagation region and the spherical wave propagation region is caused to correspond to the given signal processing target point for each transmission angle of a plurality of the transmission angles of the ultrasonic wave from the transmission processing unit. The processing unit may perform the region discrimination processing based on the table data.

With this configuration, it is possible to perform the region discrimination processing based on the stored table data.

In the aspect of the invention, the processing unit may perform the region discrimination processing based on a first direction in which the first ultrasonic transducer corresponding to an aperture end among the first to Nth ultrasonic transducers is connected to the signal processing target point, a second direction in which the Nth ultrasonic transducer corresponding to the other aperture end among the first to Nth ultrasonic transducers is connected to the signal processing target point, and the transmission angle of the ultrasonic wave.

With this configuration, it is possible to perform the region discrimination processing by using information of various directions.

In the aspect of the invention, the transmission processing unit may perform processing for transmitting first to Kth (K is an integer equal to or greater than 2) ultrasonic waves at first to Kth transmission angles. The processing unit may perform the region discrimination processing for discriminating where the signal processing target point exists in any one of an ith (i is an integer of 1≤i≤K) plane wave propagation region and an ith spherical wave propagation region corresponding to an ith ultrasonic wave based on an ith transmission angle and a position of the signal processing target point.

With this configuration, it is possible to perform the region discrimination processing with respect to each step of transmission processing when the transmission processing is performed multiple times at the varied transmission angles.

In the aspect of the invention, the processing unit may perform the phasing processing of the first to Nth reception signals corresponding to the ith ultrasonic wave based on a result of the ith step of the region discrimination processing, may synthesize the first to Nth reception signals which are obtained after the phasing processing, and may generate an ith synthetic signal which is set to focus on the signal processing target point while having first resolution. The processing unit may synthesize first to Nth synthetic signals having the first resolution, and may generate an output signal which is set to focus on the signal processing target point and has second resolution that is resolution higher than the first resolution.

With this configuration, it is possible to perform processing for obtaining a synthetic signal by synthesizing a reception signal which is acquired from each element among a plurality of elements, and to perform processing for obtaining the output signal by synthesizing the synthetic signal which is obtained in response to each step of the transmission processing among a plurality of steps of the transmission processing.

In the aspect of the invention, the processing unit may synthesize the first to Nth reception signals which are obtained after the phasing processing and may generate a synthetic image in which focusing is set on the signal processing target point.

With this configuration, it is possible to perform processing for obtaining a synthetic signal by synthesizing a reception signal which is acquired from each element among a plurality of elements.

Another aspect of the invention relates to an ultrasonic diagnostic apparatus including the ultrasonic measurement apparatus described above.

Still another aspect of the invention relates to an ultrasonic measurement method including transmitting an ultrasonic wave at a given transmission angle, receiving first to Nth (N is an integer equal to or greater than 2) reception signals of an ultrasonic echo performed with respect to the transmitted ultrasonic wave in first to Nth ultrasonic transducers, and performing, as phasing processing performed with respect to each of the reception signals of the first to Nth reception signals, first phasing processing when a signal processing target point exists in a plane wave propagation region in which the ultrasonic wave is propagated as a plane wave, and second phasing processing when the signal processing target point exists in a spherical wave propagation region in which the ultrasonic wave is propagated as a spherical wave.

BRIEF DESCRIPTION OF THE DRAWINGS

The invention will be described with reference to the accompanying drawings, wherein like numbers reference like elements.

FIG. 10 is a configuration example of an ultrasonic diagnostic apparatus which includes the ultrasonic measurement apparatus.

FIGS. 11A to 11C are specification examples of the ultrasonic diagnostic apparatus.

FIGS. 17A and 17B are examples of table data.

DESCRIPTION OF EXEMPLARY EMBODIMENTS

Hereinafter, an embodiment will be described. The below-described embodiment does not unjustly limit the contents of the invention disclosed in aspects of the invention. All the configurations described in the embodiment are not necessarily the essential configuration element of the invention.
1. Technique of Embodiment Firstly, technique of the embodiment will be described. Regarding technique of performing transmission and reception of a signal in an ultrasonic measurement apparatus, there is known technique of focusing on a given measurement point at the time of transmitting an ultrasonic wave signal. For example, with respect to each of the elements in an element array (for example, corresponding to an ultrasonic transducer device described below in FIGS. 13 to 14B) including a plurality of ultrasonic transducer elements 10, a corresponding delay is applied to each of the elements at the time of driving. Since an ultrasonic wave transmitted by such technique focuses on a predetermined measurement point, if a reflected wave of the ultrasonic wave is received in the element array, it is possible to acquire an ultrasonic wave signal (in a narrow sense, an ultrasonic image) which focuses on the measurement point.

However, in such technique, the measurement point to be focused on is decided at the time of transmitting the ultrasonic wave signal. Therefore, when it is intended to generate an ultrasonic image in which focusing is performed on a plurality of the measurement points (in a narrow sense, all points in an image), there is a need to perform driving of the element array, and transmitting and receiving of the ultrasonic wave signal as many times as the number of the plurality of the measurement points.

In technique of so-called synthetic aperture processing which is widely used today, there is no need to perform focusing on a predetermined measurement point at the time of transmission as described above. Specifically, a given transmission wave is transmitted, and a reflected wave of the transmission wave is received by a plurality of the elements. When a signal processing target point which is a position (may be multiple, in a narrow sense, points throughout the overall region of the image when an ultrasonic image is formed) desired to be focused on is set and it is assumed that transmission waves reach (are propagated) all the set signal processing target points, reception signals which are received by the ultrasonic transducer elements include information of the reflected waves of all the signal processing target points. For example, when it is assumed that there are M signal processing target points $r_1$ to $r_M$ as the signal processing target points, reception signals $s(t)$ of given ultrasonic transducer elements are information in which all the reflected waves from $r_1$ to $r_M$ are reflected. Herein, the reference sign t is a variable which indicates a time or sampling timing.

Figure 1A:
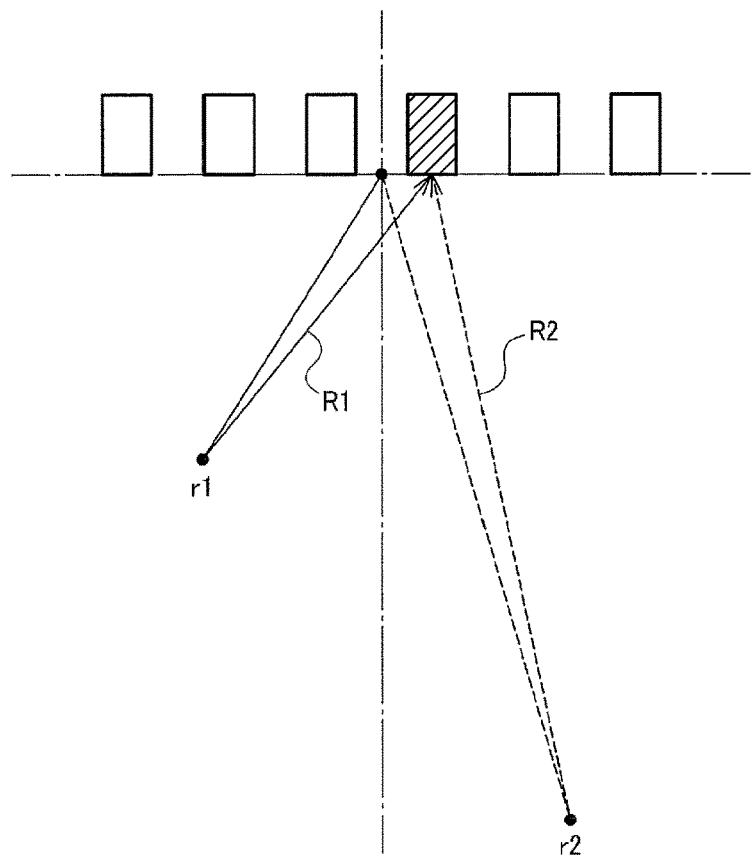
FIGS. 1A and 1B are diagrams illustrating reception timing of a reflected wave which is different from each other in accordance with a position of a signal processing target point.
Figure 1B:
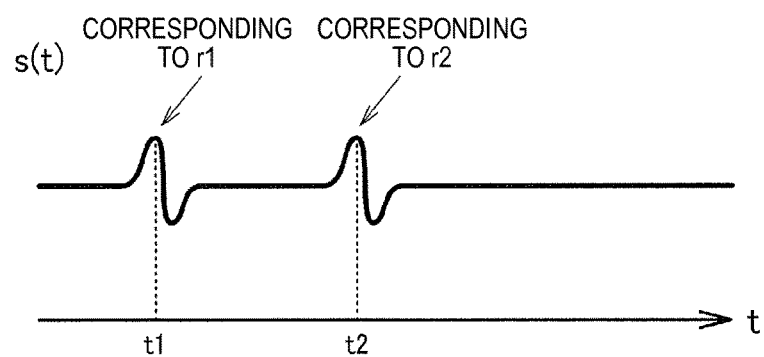

The reception signal s is a function of which the value (an amplitude value) varies in a chronological order as described above. However, not all the reflected waves from $r_1$ to $r_M$ are acquired at the same timing. When it is assumed that a transmission wave is generated from the center point of the element array, propagation paths of ultrasonic waves are different from each other in accordance with the position of the signal processing target point, for example, a signal which corresponds to $r_1$ as illustrated in FIG. 1A is received by an element through a transmission and reception path indicated with $R_1$, and a signal which corresponds to $r_2$ is received by an element through another transmission and reception path indicated with $R_2$. When the lengths of the propagation paths are different from each other, the timing at which the signal of the reflected wave is received in the element is different from each other. In other words, in a case of the length of $R_1$<the length of $R_2$ as illustrated in FIG. 1A, a signal corresponding to the signal processing target point r1 is presented as a signal of which t is relatively small (early in time order) in the reception signals $s(t)$ of the target element, and a signal corresponding to the signal processing target point $r_2$ is presented as a signal of which t is relatively significant (late in time order) in the reception signal $s(t)$, as illustrated in FIG. 1B.

Accordingly, if a time $t_1$ at which a reflected wave from $r_1$ is received, and a time $t_2$ at which a reflected wave from $r_2$ is received can be specified, it is considered that a signal $s(t_1)$ includes a signal of the reflected wave from $r_1$, and a signal $s(t_2)$ includes as signal of the reflected wave from $r_2$. In this case, there is a relationship of $t_1 < t_2$, as described above.

Figure 2:
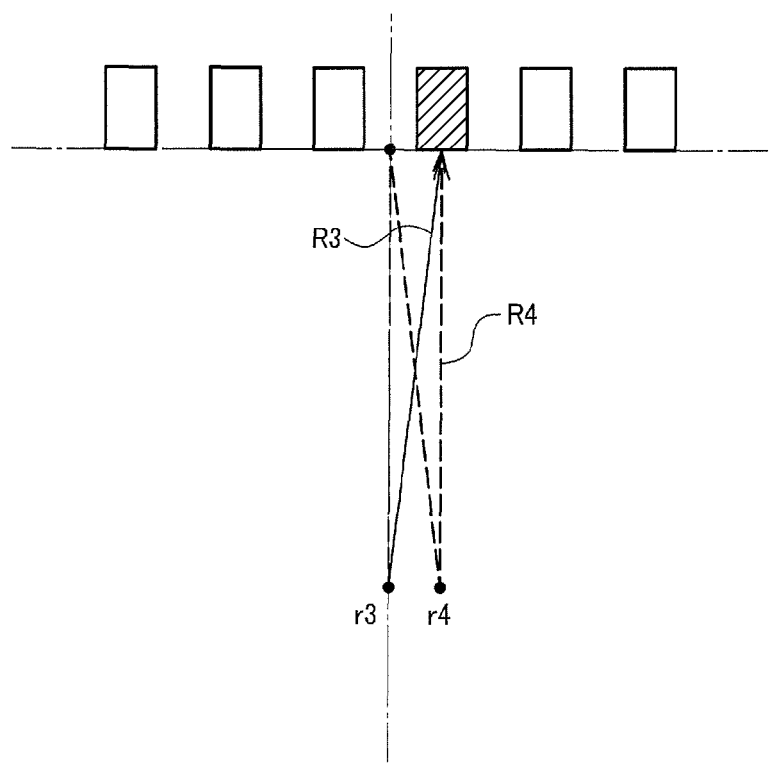
FIG. 2 is an example in which signals from the signal processing target points different from each other are received at the same timing.

However, when taking only one element into consideration, in the signal processing target points indicated with $r_3$ and $r_4$ in FIG. 2, the propagation paths thereof are $R_3$ and $R_4$ being different from each other. However, since there is a relationship of the length of $R_3$=the length of $R_4$, a signal $s(t_3)$ includes both a signal of the reflected wave from $r_3$ and a signal of the reflected wave from $r_4$. In other words, if the reflected wave is from only one element, it is not easy to separate information from only one particular signal processing target point. Originally, if an aperture width is narrow, resolution of a reception signal (resolution in an ultrasonic image) is also degraded. Therefore, generally, the element array is formed by arranging the plurality of elements in the ultrasonic measurement apparatus.

Accordingly, reception signals of the plurality of elements are used in the synthetic aperture processing as inevitable processing. Specifically, when the ultrasonic measurement apparatus includes first to Nth (N is an integer equal to or greater than 2) ultrasonic transducer elements, a reception signal is acquired in each of the elements through transmission of the given transmission wave. Therefore, N reception signals $s_1(t)$ to $s_N(t)$ can be acquired. Each of the N reception signals includes information from a plurality of the signal processing target points (in the above-referenced assumption, all from $r_1$ to $r_M$). In this case, since the position of each of the elements is different from each other, $R_{11}$ to $R_{1N}$ become the paths which respectively correspond to the elements so that a propagation path $R_{11}$ corresponding to $r_1$ in a first element 10-1 and a propagation path $R_{12}$ corresponding to $r_1$ in a second element 10-2 are different from each other. Then, values $t_{11}$ to $t_{1N}$ can be obtained for each element regarding the time when a reflected wave is received from $r_1$.

Figures 3, 4:
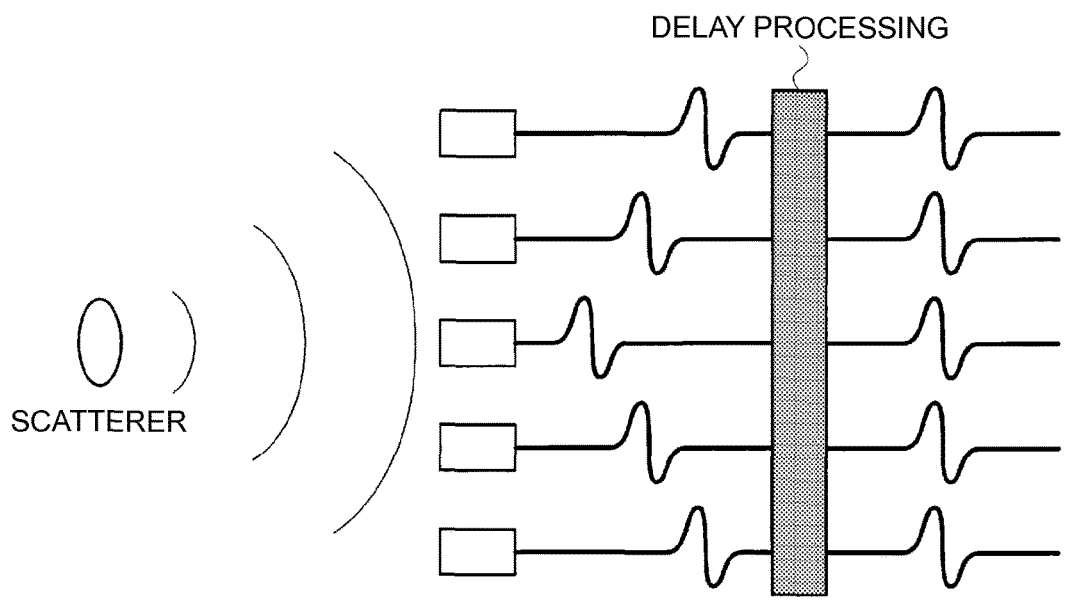
FIG. 3 is an explanatory diagram of phasing processing.
FIG. 4 is a diagram illustrating synthesizing processing of the N reception signals which are received by N elements.

In this case, in order to suitably obtain a reception signal from a particular signal processing target point, phasing processing may be performed as illustrated in FIG. 3 so as to align deviation of the reception timing, that is, phase deviation in the reception signal s. In FIG. 3, the extracted signals corresponding to the desired signal processing target points among the reception signals s of each of the elements are illustrated in the horizontal axis direction. When the signal processing target point is an example of $r_1$, information corresponding to $t_{11}$ to $t_{1N}$ described above may be obtained, and $s_1(t_{11})+s_2(t_{12})$ and so on to $s_N(t_{1N})$ may be obtained.

In this case, for example, information corresponding to a different signal processing target point $r_m$ may be included in $s_1(t_{11})$ as described above with reference to FIG. 2. However, even when there is a relationship of the length of $R_{11}$=the length of $R_{1m}$ in a case of the first element, if all the elements from the second to Nth are considered, it is inconceivable that all of $R_{12}$ and $R_{1m}$, $R_{13}$ and $R_{1m}$, and so on to $R_{1N}$ and $R_{1m}$ have uniform relationships (for example, being equivalent in size). In other words, the times such as $t_{12}$, $t_{13}$, and so on to $t_{1N}$ are not information which corresponds to the signal processing target point $r_m$, and the signals such as $s_1(t_{11})+s_2(t_{12})$ and so on to $s_N(t_{1N})$ are irrelevant to the signal processing target point $r_m$. Therefore, when $s_1(t_{11})+s_2(t_{12})$ and so on to $s_N(t_{1N})$ are considered in the entirety, it is assumed that the information regarding the signal processing target point $r_m$ is cancelled so as to be zero (otherwise, a value which can be considered to be sufficiently close thereto).

According to the technique described above, there is no need for the given signal processing target point to be focused on at the time of transmission. Therefore, signals of the plurality of elements are synthesized by suitably performing phasing processing with respect to a reception signal, and thus, it is possible to acquire a reception signal which focuses on the given signal processing target point. Specifically, when $s_1(t_{11})+s_2(t_{12})$ and so on to $s_N(t_{1N})$ are applied as a signal (for example, a pixel value at a pixel position corresponding to r1 in an ultrasonic image) of the signal processing target point $r_1$, it is possible to acquire a signal which focuses on a portion of $r_1$. FIG. 4 illustrates an image of synthesis described above. Since FIG. 4 is an example of a case where one signal processing target point r is set, when it is desired to focus on the plurality of signal processing target points, the synthesizing processing illustrated in FIG. 4 is executed as many times as the number of the signal processing target points.

However, the above descriptions are given on the basis of the assumption in that a transmission wave reaches a desired signal processing target point at sufficient intensity, and information corresponding to each of the signal processing target points can be acquired as a reception signal of each of the elements. However, it is difficult to say such an assumption is realistic. As an example, when performing controlling so as to improve signal intensity and the like by enhancing directivity of a transmission wave, the transmission wave sometimes reaches only the signal processing target point within a range for one line (one line in a depth direction in a case where an ultrasonic image is generated). In this case, since a reflected wave of a transmission wave is generated in only the signal processing target point included in the line, even though the phasing processing and the synthesizing processing from $s_1$ to $s_N$ are performed, focusing is limited to the signal processing target point which is included in the line. As a result, when it is desired to output an ultrasonic image configured to have a number of the lines, there is a need to output transmission waves as many times as the number of the lines, and thus, the time taken for forming one ultrasonic image is lengthened.

As a type of technique coping therewith, JP-A-2003-220059 and Non Patent Literature 1 disclose technique of transmitting a plane wave. The plane wave is transmitted within a wide range in a transverse direction (a direction along the direction of an element line), and even though the depth direction (a direction orthogonal to the direction of the element line) is deepened, attenuation in intensity of waves, that is, sound pressure is insignificant. In other words, since a signal can be caused to reach a wide range with sufficient intensity even in one transmission as the plane waves are used, each of the elements can also receive information from a number of the signal processing target points with sufficient intensity. Therefore, it is possible to output a signal having approximately equivalent resolution with the fewer number of times of transmissions compared to a case where the plane waves are not used (for example, in a case where a transmission wave is transmitted while being limited to one line as described above).

Figure 5:
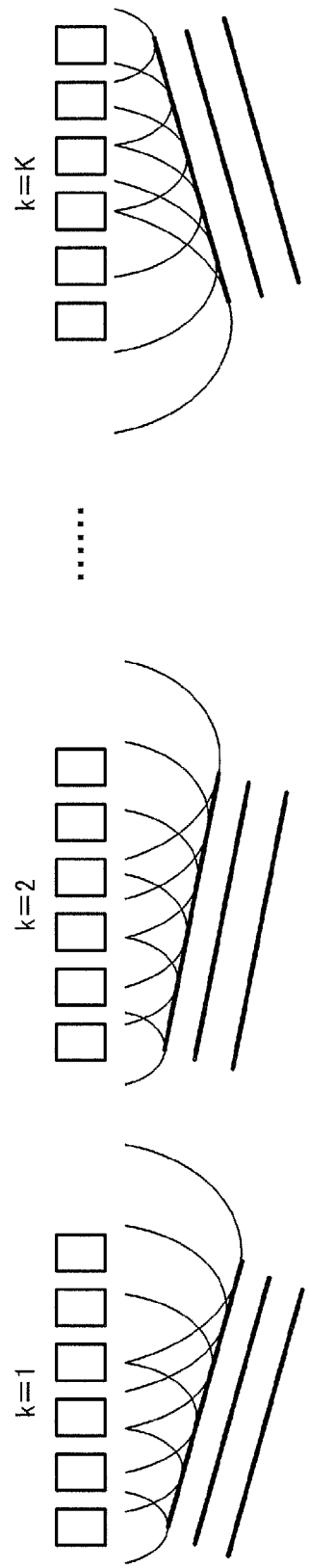
FIG. 5 is an explanatory diagram of transmissions performed multiple times at varied transmission angles.
Figure 6:
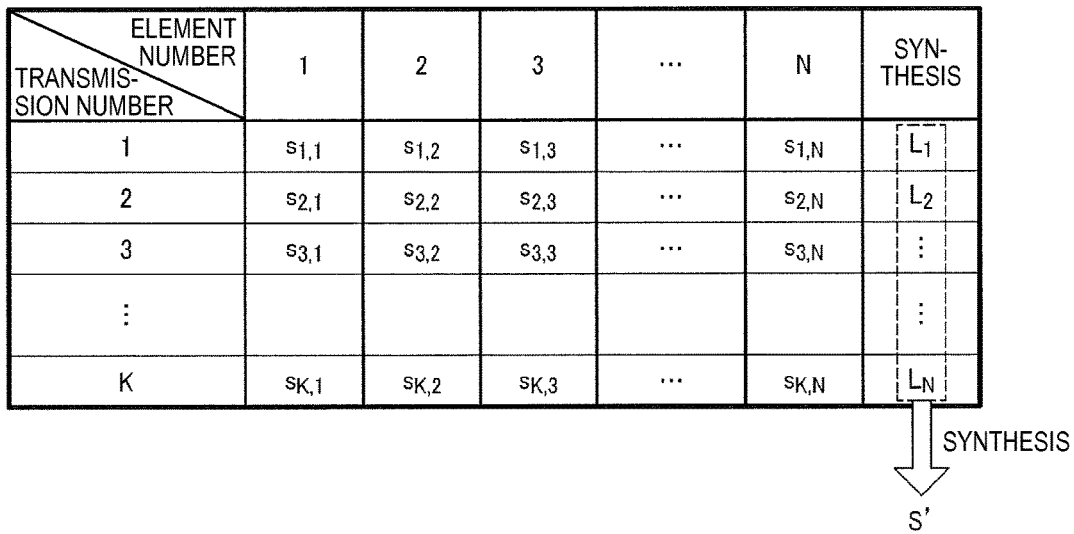
FIG. 6 is a diagram illustrating synthesizing processing of K×N reception signals which are received by the N elements through K times of transmissions of transmission waves.

As illustrated in FIG. 5, when transmission of transmission waves is performed K times at varied transmission angles, the N reception signals s corresponding to the number of the elements are acquired with respect to one transmission, and a first resolution signal L is acquired by synthesizing the acquired N reception signals s after phasing processing as illustrated in FIG. 3. This process corresponds to synthesizing in FIG. 4. When focusing on one given signal processing target point, since the first resolution signal L is acquired in one transmission, if transmission is performed K times, it is possible to acquire K first resolution signals L. Since all the acquired K first resolution signals L indicate information regarding the one signal processing target point which is currently focused on, it is possible to obtain a second resolution signal s' having higher resolution by synthesizing the K first resolution signals L further. FIG. 6 illustrates a flow thereof. The synthesis in FIG. 6 in the transverse direction corresponds to the synthesis in FIG. 4, that is, the synthesis of the first resolution signal L, and the synthesis in FIG. 6 in a vertical direction corresponds to the synthesis of the second resolution signal s'. Since FIG. 6 is an example of a case where one signal processing target point r is set similarly to that in FIG. 4, when it is desired to focus on the plurality of signal processing target points, the synthesizing processing illustrated in FIG. 6 is executed as many times as the number of the signal processing target points.

Figure 7:
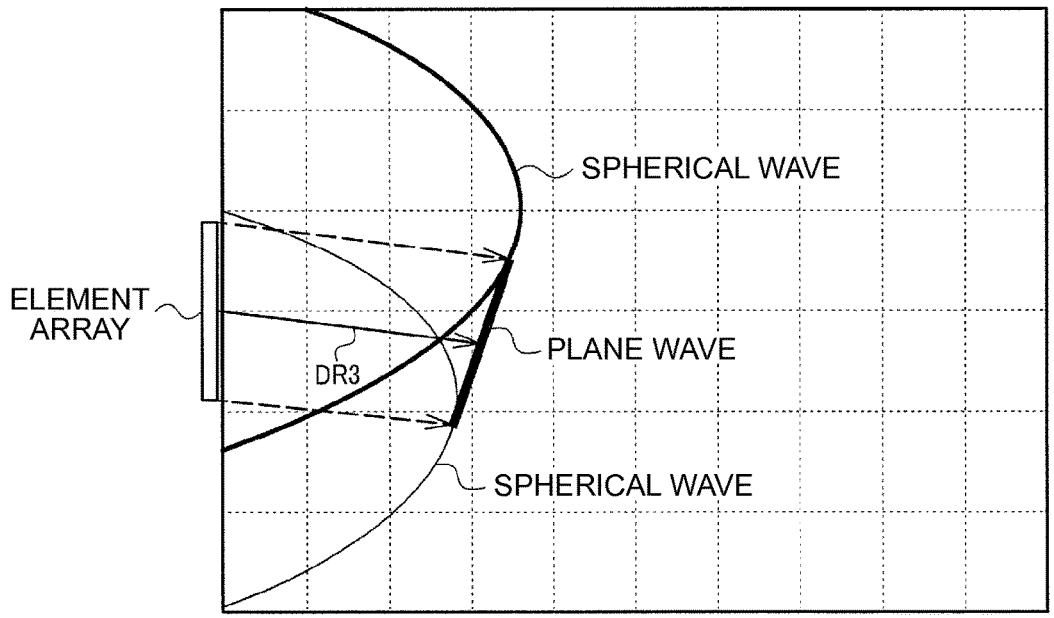
FIG. 7 is a sound field model at the time of transmitting a plane wave.

Hereinbefore, descriptions are given regarding a schematic example of processing technique in the related art using synthetic aperture processing and plane waves as the transmission waves thereof. However, in the technique in the related art such as that disclosed in Non Patent Literature 1, a signal of a wave other than that of the plane wave is not taken into consideration. FIG. 7 illustrates a sound field model in the vicinity of an element array when a plane wave is transmitted from the element array. The reference sign DR3 in FIG. 7 indicates a transmission direction of the plane wave, and it is shown that the wave surface which is in the definitely same phase appears to be in a straight line in the direction of DR3 with respect to the element array and the plane wave is propagated. Specifically, when straight lines parallel to DR3 are drawn while having two end points (the aperture ends) as starting points from the element array, it is possible to say that the plane wave is propagated in the region between the two straight lines. In contrast, as is clear from FIG. 7, the wave surface which is in the same phase appears to be in a curved line in regions other than that, and it is considered that a spherical wave is propagated in the region. In other words, even in circumstances where a plane wave is transmitted from the element array, there exist a region in which the plane wave is propagated (hereinafter, referred to as the plane wave propagation region) and a region in which the spherical wave is propagated (hereinafter, referred to as the spherical wave propagation region).

Figure 8A:
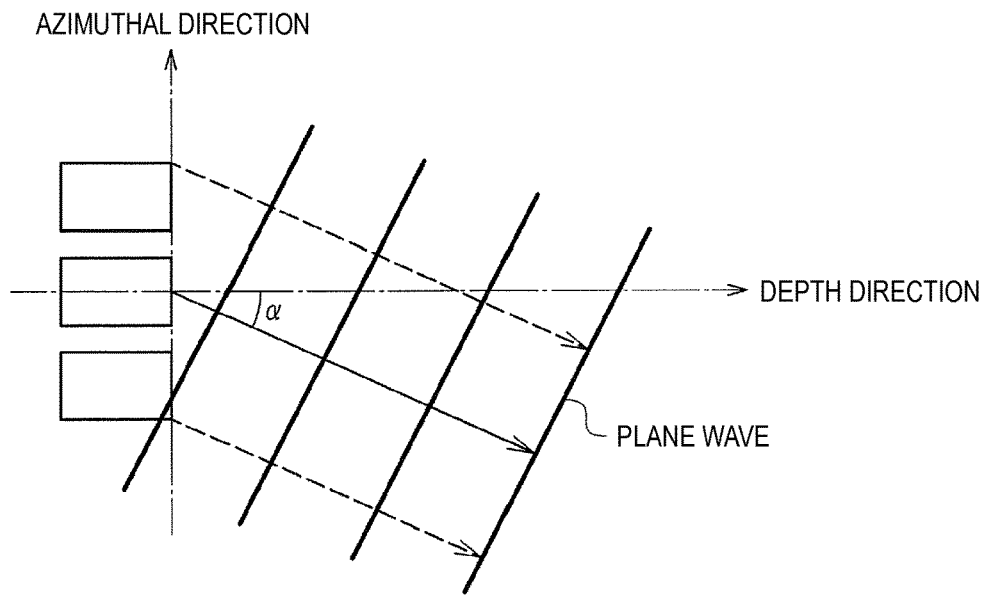
FIG. 8A is a geometric model which is obtained by the technique in the related art.

Therefore, in the technique to which the above described synthetic aperture processing is applied, if only the plane wave propagation region is subjected to the processing target, the aperture width effective for transmission becomes small, thereby leading to a disadvantage in that resolution of an obtained image is degraded as a result thereof. Meanwhile, when the spherical wave propagation region is subjected to the processing target, it is inevitably considered that a plane wave is also propagated in that region, in regard to the technique in the related art as illustrated in FIG. 8A. The spherical wave and the plane wave are different from each other in the propagation model of ultrasonic waves for transmission and reception, as described below with reference to FIGS. 18 to 19B. Therefore, the above-described propagation path R varies, and the calculated propagation time (the delay time) t varies as well.

As described above, the phasing processing is important processing in order to take out information of the desired signal processing target point from the reception signal s. Therefore, the factor t needs to be accurately obtained. Particularly, as described above with reference to $r_m$, when the delay time t no longer corresponds to the signal processing target point, there is a possibility that the information regarding the signal processing target point is cancelled by the reception signal s in a different element so that the information is not reflected in the computation result. As a result, if computation is performed on an assumption that the plane wave is propagated with respect to the signal processing target point of the spherical wave propagation region, it is not possible to be focused on the signal processing target point.

Figure 8B:
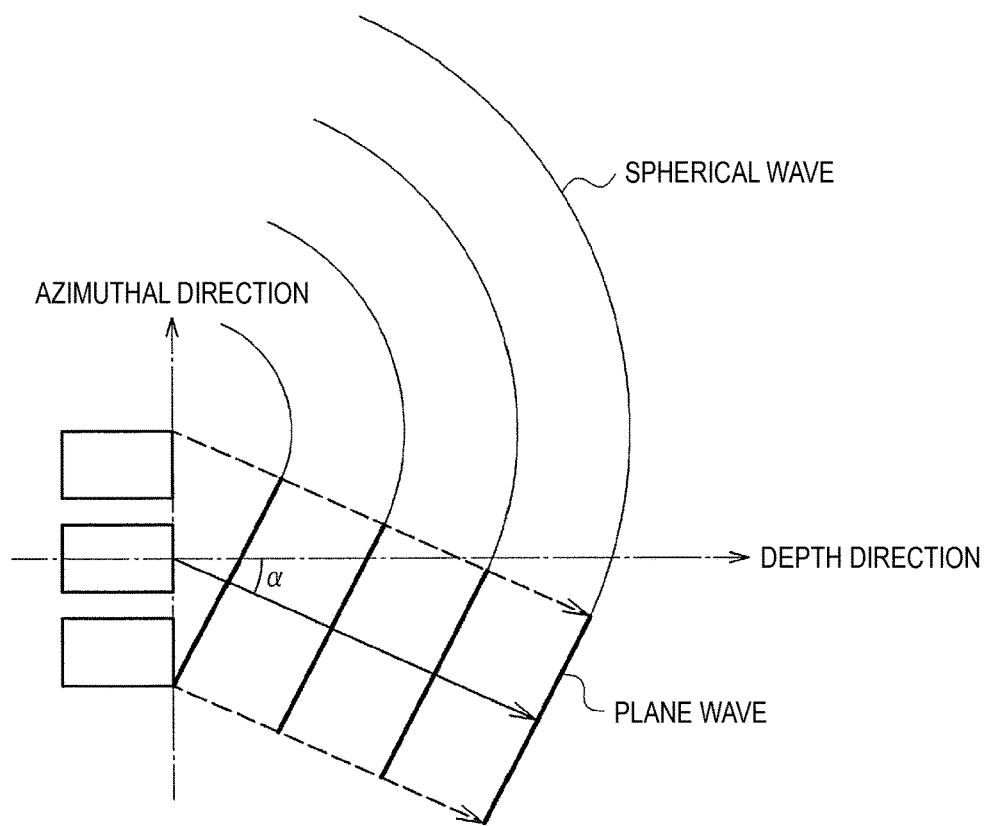
FIG. 8B is a geometric model which is applied to an embodiment.
Figure 9:
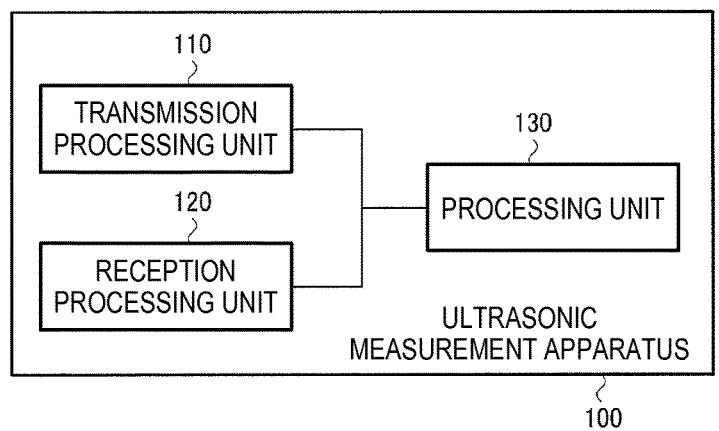
FIG. 9 is a configuration example of an ultrasonic measurement apparatus of the embodiment.

Therefore, as illustrated in FIG. 8B, this applicant performs synthetic aperture processing in consideration of the existence of a region in which a wave other than the plane wave is propagated even when transmitting the plane wave. Specifically, as illustrated in FIG. 9, an ultrasonic measurement apparatus 100 of the embodiment includes a transmission processing unit 110 which performs processing for transmitting ultrasonic waves at a given transmission angle, a reception processing unit 120 which performs reception processing of an ultrasonic echo with respect to the transmitted ultrasonic wave in first to Nth (N is an integer equal to or greater than 2) ultrasonic transducers, and a processing unit 130 which performs processing with respect to first to Nth reception signals $s_1$ to $s_N$ corresponding to the first to Nth ultrasonic transducers. The processing unit 130 performs phasing processing with respect to each of the reception signals of the first to Nth reception signals $s_1$ to $s_N$, such as the first phasing processing performed when the signal processing target point r exists in the plane wave propagation region in which an ultrasonic wave is propagated as the plane wave, and the second phasing processing performed when the signal processing target point r exists in the spherical wave propagation region in which an ultrasonic wave is propagated as the spherical wave.

Here, the transmission angle controlled by the transmission processing unit 110 denotes a direction in which a plane wave is transmitted, in a narrow sense, and also indicates an angle representing the direction DR3 in FIG. 7. As an example, while having a direction perpendicular to the element array as a standard, as in FIG. 15 described below, an angle α formed by the aforementioned direction and the DR3 may be defined as the transmission angle. As described above, since it is assumed that the transmission wave is transmitted multiple times even when the plane wave is used, the aforementioned given transmission angle is not limited to being one angle. Therefore, transmission processing may be performed multiple times at the varied transmission angles.

Herein, the phasing processing is processing of aligning the phases of the plurality of reception signals $s_1$ to $s_N$ as illustrated in FIG. 3, and includes processing for obtaining at least a deviation amount of the phases (in a narrow sense, the delay time). In other words, the first phasing processing and the second phasing processing may be considered as two types of processing different from each other in the method of obtaining the deviation amount of the phases.

In this manner, a signal of a region in which a wave other than the plane wave is propagated can also be applied to the processing when transmitting a plane wave. Accordingly, since the aperture width effective for transmission does not become small, it is possible to prevent resolution of an image from being degraded. In this case, since it is possible to perform processing different from that for the plane wave propagation region, that is, processing corresponding to the spherical wave with respect to the spherical wave propagation region as well, a signal from the signal processing target point which is positioned in the spherical wave propagation region can also be suitably utilized in the processing.

Hereinafter, a specific example of the system configuration of the ultrasonic measurement apparatus 100 of the embodiment will be described, and then, descriptions will be given regarding region discrimination processing for discriminating where the given signal processing target point is positioned in any one of the plane wave propagation region and the spherical wave propagation region. Thereafter, descriptions will be given regarding a specification example of phasing processing in which a result of the region discrimination processing is applied, and a specification example of the synthesizing processing performed after the phasing processing.

2. Example of System Configuration

The configuration example of the ultrasonic measurement apparatus 100 of the embodiment is illustrated in FIG. 9. FIG. 10 illustrates a specific configuration example of an ultrasonic diagnostic apparatus including the ultrasonic measurement apparatus of the embodiment. The ultrasonic diagnostic apparatus includes the ultrasonic measurement apparatus 100, an ultrasonic probe 200, and a display unit 300. As illustrated in FIG. 10, the ultrasonic measurement apparatus 100 of the embodiment may include the transmission processing unit 110, the reception processing unit 120, the processing unit 130, a transmission and reception switch 140, a digital scan converter (DSC) 150, and a control circuit 160.

The technique of the embodiment is not limited to that applied to the ultrasonic measurement apparatus 100 illustrated in FIG. 9. The technique can also be applied to the ultrasonic diagnostic apparatus including the ultrasonic measurement apparatus 100 as illustrated in FIG. 10.

The ultrasonic measurement apparatus 100 and the ultrasonic diagnostic apparatus including thereof are not limited to the configurations in FIGS. 9 and 10, and various modifications can be executed by omitting a portion of the configuration elements thereof or adding other configuration elements thereto. In addition, a portion or all of the functions of the ultrasonic measurement apparatus 100 of the embodiment and the ultrasonic diagnostic apparatus including thereof may be realized by a server which is connected through communication.

The ultrasonic probe 200 includes the ultrasonic transducer device. The ultrasonic transducer device transmits an ultrasonic beam to a target object while scanning the target object along a scanning surface and receives an ultrasonic echo of the ultrasonic beam. In an example of a type thereof using a piezoelectric element, the ultrasonic transducer device includes the plurality of ultrasonic transducer elements (an ultrasonic element array), and a substrate in which a plurality of the apertures are arranged in an array shape. An element having a monomorph (unimorph) structure in which a thin piezoelectric element and a metal plate (a vibration film) are pasted together is used as the ultrasonic transducer element. The ultrasonic transducer element (a vibration element) converts electrical vibration into mechanical vibration. However, in this case, when the piezoelectric element expands and contracts within the surface, since the measurements of the pasted metal plate (the vibration film) do not change, there is an occurrence of a warp.

In the ultrasonic transducer device, one channel may be configured to include several ultrasonic transducer elements which are arranged to be adjacent to one another, and an ultrasonic beam may be sequentially moved while driving a plurality of the channels at a time.

A transducer in a type using the piezoelectric element (a thin film piezoelectric element) can be employed as the ultrasonic transducer device. However, the embodiment is not limited thereto. For example, a transducer in a type using a capacitive element such as a capacitive micro-machined ultrasonic transducer (c-MUT) may be employed, or a bulk-type transducer may be employed. The ultrasonic transducer element and the ultrasonic transducer device will be described later further in detail.

The transmission processing unit 110 performs processing for transmitting an ultrasonic wave to a target object. As illustrated in FIG. 10, the transmission processing unit 110 may include a transmission pulse generator 111 and a transmission delay circuit 113.

The transmission pulse generator 111 applies a transmission pulse voltage so as to drive the ultrasonic probe 200. The transmission delay circuit 113 applies a differential time between the channels regarding the timing of applying the transmission pulse voltage and decides a propagation direction of ultrasonic waves generated from the plurality of vibration elements. In this manner, the transmission direction DR3 (the transmission angle α) of a plane wave can be controlled by varying a delay time.

The transmission and reception switch 140 performs switching processing for transmitting and receiving an ultrasonic wave. The transmission and reception switch 140 protects amplitude pulses during a transmission from being input to a reception circuit, and allows a signal during a reception to pass through the reception circuit.

Meanwhile, the reception processing unit 120 performs reception processing of an ultrasonic echo with respect to a transmitted ultrasonic wave. As illustrated in FIG. 10, the reception processing unit 120 may include a memory 125. The reception processing unit 120 causes the memory 125 to store reception signals (in a narrow sense, $s_1$ to $s_N$) from the ultrasonic probe 200 and outputs the reception signals to the processing unit 130. The functions of the memory 125 can be realized by a memory such as a RAM, or a HDD.

The processing unit 130 performs processing with respect to a reception signal from the reception processing unit 120. The functions of the processing unit 130 can be realized by hardware such as various processors (CPU and the like) and ASIC (a gate array and the like), or a program. As illustrated in FIG. 10, the processing unit 130 includes a region discrimination processing unit 131, a phasing processing unit 132, a first beamforming coefficient calculation unit 133, a first resolution signal synthesis unit 134, a second beamforming coefficient calculation unit 135, and a second resolution signal synthesis unit 136.

The region discrimination processing unit 131 performs region discrimination processing for discriminating where a signal processing target point which is a processing target, that is, a target point to be focused on is positioned in any one of the plane wave propagation region and the spherical wave propagation region. The region discrimination processing will be described later in detail.

The phasing processing unit 132 performs the phasing processing in accordance with whether the signal processing target point exists in the plane wave propagation region or exists in the spherical wave propagation region. Specifically, the delay time (the deviation amount of the phases) can be obtained by using each of the propagation models for the plane wave and the spherical wave. The processing of the phasing processing unit 132 will be described later with reference to FIG. 18 and the like.

The first beamforming coefficient calculation unit 133 calculates the first beamforming coefficient which is a coefficient used when synthesizing the reception signals $s_1$ to $s_N$ after the phasing processing. In the embodiment, all the coefficients may be set to 1 as described above, or a fixed value set in advance may be used. In such a case, since there is no need to perform processing for adaptively obtaining the first beamforming coefficient, the first beamforming coefficient calculation unit 133 may be omitted.

The first resolution signal synthesis unit 134 performs the synthesizing processing of reception signals of the N elements with respect to one transmission wave based on the reception signals $s_1$ to $s_N$ after the phasing processing, and the first beamforming coefficient. Specifically, the first resolution signal L may be obtained by performing the above-described processing with reference to FIG. 4.

The second beamforming coefficient calculation unit 135 calculates the second beamforming coefficient which is a coefficient used when synthesizing the second resolution signal s' based on the first resolution signal L as many as the number (K) of times of transmissions. Regarding the second beamforming coefficient, all the coefficients may be set to 1, or a fixed value set in advance may be used, thus the second beamforming coefficient calculation unit 135 can be omitted.

The second resolution signal synthesis unit 136 obtains a signal regarding the given signal processing target point by using K times of transmissions of transmission waves and information of the N elements based on the K first resolution signals L obtained by the first resolution signal synthesis unit 134, and the second beamforming coefficient. Specifically, the second resolution signal s' may be obtained by performing the above-described processing with reference to FIG. 6.

The DSC 150 performs scanning conversion processing with respect to B-mode image data. For example, the DSC 150 converts a line signal into an image signal through interpolation processing such as a bilinear method. The control circuit 160 is mutually connected to each of the units of the ultrasonic measurement apparatus 100 and controls each of the connected units.

The display unit 300 displays image data for displaying generated in the DSC 150 by using the second resolution signal s'. For example, the display unit 300 may be realized by a liquid crystal display, an organic EL display, an electronic paper, or the like.

Here, FIGS. 11A to 11C illustrate specific examples of configurations of the instruments in the ultrasonic diagnostic apparatus (in a broad sense, an electronic instrument) of the embodiment. FIG. 11A is an example of a portable ultrasonic diagnostic apparatus, and FIG. 11B is an example of a stationary ultrasonic diagnostic apparatus. FIG. 11C is an example of an integrated ultrasonic diagnostic apparatus equipped with the built-in ultrasonic probe 200.

The ultrasonic diagnostic apparatus in FIGS. 11A and 11B includes the ultrasonic probe 200 and an ultrasonic measurement apparatus main body 101 (in a broad sense, an electronic instrument main body). The ultrasonic probe 200 and the ultrasonic measurement apparatus main body 101 are connected to each other by a cable 210. A probe head 220 is provided at the tip end portion of the ultrasonic probe 200, and the display unit 300 for displaying an image is provided in the ultrasonic measurement apparatus main body 101. In FIG. 11C, the ultrasonic probe 200 is built in the ultrasonic measurement apparatus 100 having the display unit 300. In a case of FIG. 11C, the ultrasonic measurement apparatus 100 can be realized by a general-purpose portable information terminal, for example, a smartphone.

Figure 12A:
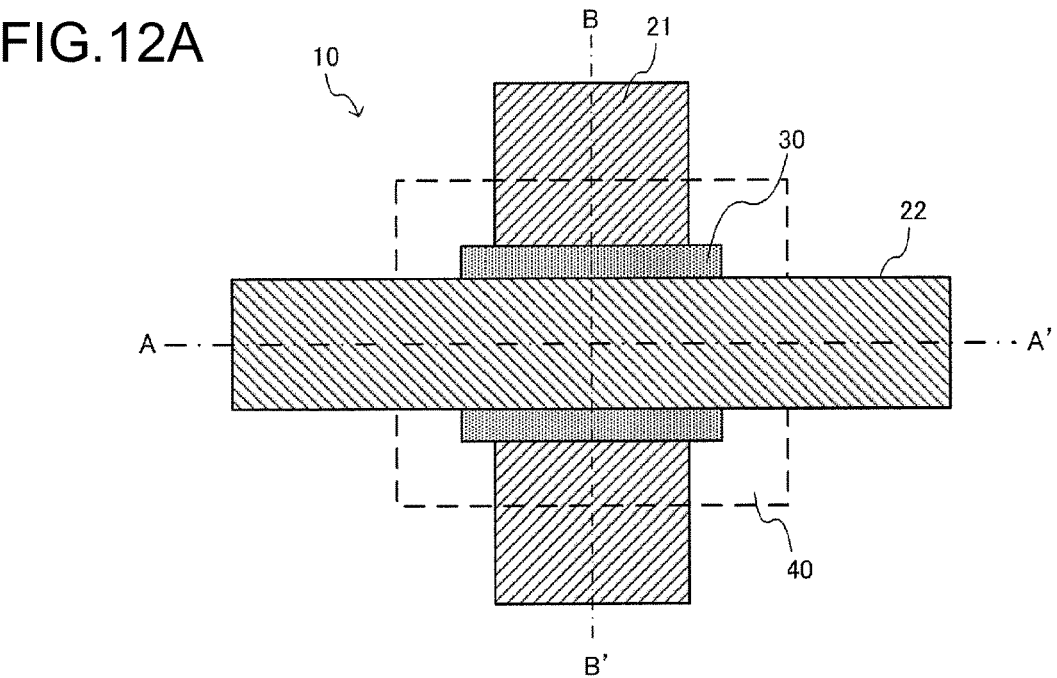
FIGS. 12A to 12C are configuration examples of an ultrasonic transducer element.
Figure 12B:
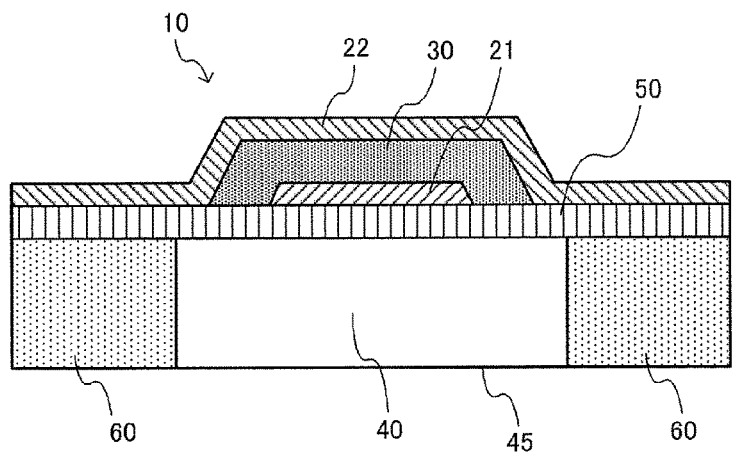
Figure 12C:
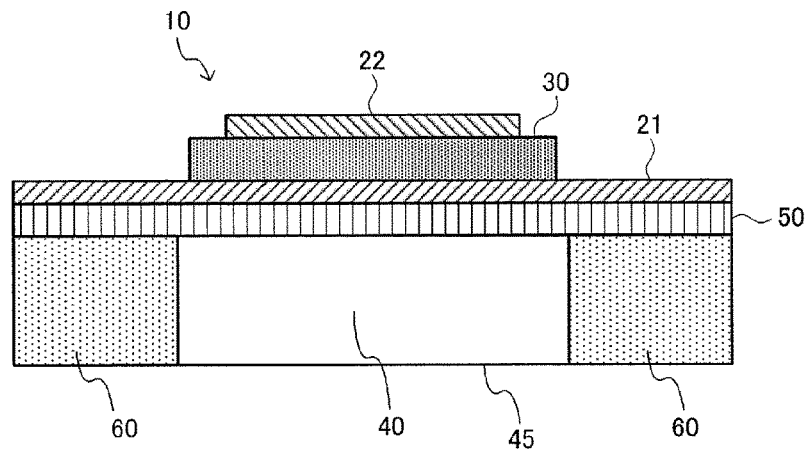

FIGS. 12A to 12C illustrate a configuration example of an ultrasonic transducer element 10 of the ultrasonic transducer device. The ultrasonic transducer element 10 includes a vibration film (a membrane and a support member) 50 and a piezoelectric element portion. The piezoelectric element portion includes a first electrode layer (a lower electrode) 21, a piezoelectric layer (a piezoelectric film) 30, and a second electrode layer (an upper electrode) 22.

FIG. 12A is a plan view of the ultrasonic transducer element 10 which is formed in a substrate (a silicon substrate) 60 seen in a direction vertical to the substrate 60 on the element forming surface side. FIG. 12B is a cross-sectional view illustrating a cross section taken along line A-A' in FIG. 12A. FIG. 12C is a cross-sectional view illustrating a cross section taken along line B-B' in FIG. 12A.

The first electrode layer 21 is formed with a metallic thin film, for example, on an upper layer of the vibration film 50. The first electrode layer 21 may be a wire which extends to the outside of an element forming region as illustrated in FIG. 12A and is connected to the adjacent ultrasonic transducer element 10.

For example, the piezoelectric layer 30 is formed with a lead zirconate titanate (PZT) thin film and is provided so as to cover at least a portion of the first electrode layer 21. The material of the piezoelectric layer 30 is not limited to PZT. For example, lead titanate (PbTiO3), lead zirconate (PbZrO3), titanate lead lanthanum ((Pb, La) TiO3), and the like may be used.

For example, the second electrode layer 22 is formed with a metallic thin film and is provided so as to cover at least a portion of the piezoelectric layer 30. The second electrode layer 22 may be a wire which extends to the outside of an element forming region as illustrated in FIG. 12A and is connected to the adjacent ultrasonic transducer element 10.

For example, the vibration film (the membrane) 50 is provided so as to block an aperture 40 with a two-layer structure of a SiO2 thin film and a ZrO2 thin film. The vibration film 50 supports the piezoelectric layer 30, and first and second electrode layers 21 and 22. The vibration film 50 vibrates in accordance with expansion and contraction of the piezoelectric layer 30 and can generate ultrasonic waves.

The aperture 40 is formed by performing etching such as reactive ion etching (RIE) from a rear surface (a surface with no element formed thereon) side of the substrate 60 (the silicon substrate). The resonance frequency of the ultrasonic wave is decided in accordance with the size of an aperture portion 45 of the aperture 40, and the ultrasonic wave is emitted to the piezoelectric layer 30 side (in the front direction from the back on the sheet surface in FIG. 12A).

The lower electrode (a first electrode) of the ultrasonic transducer element 10 is formed by the first electrode layer 21, and the upper electrode (a second electrode) is formed by the second electrode layer 22. Specifically, a portion of the first electrode layer 21 covered with the piezoelectric layer 30 forms the lower electrode, and a portion of the second electrode layer 22 covering the piezoelectric layer 30 forms the upper electrode. In other words, the piezoelectric layer 30 is provided so as to be interposed between the lower electrode and the upper electrode.

Figure 13:
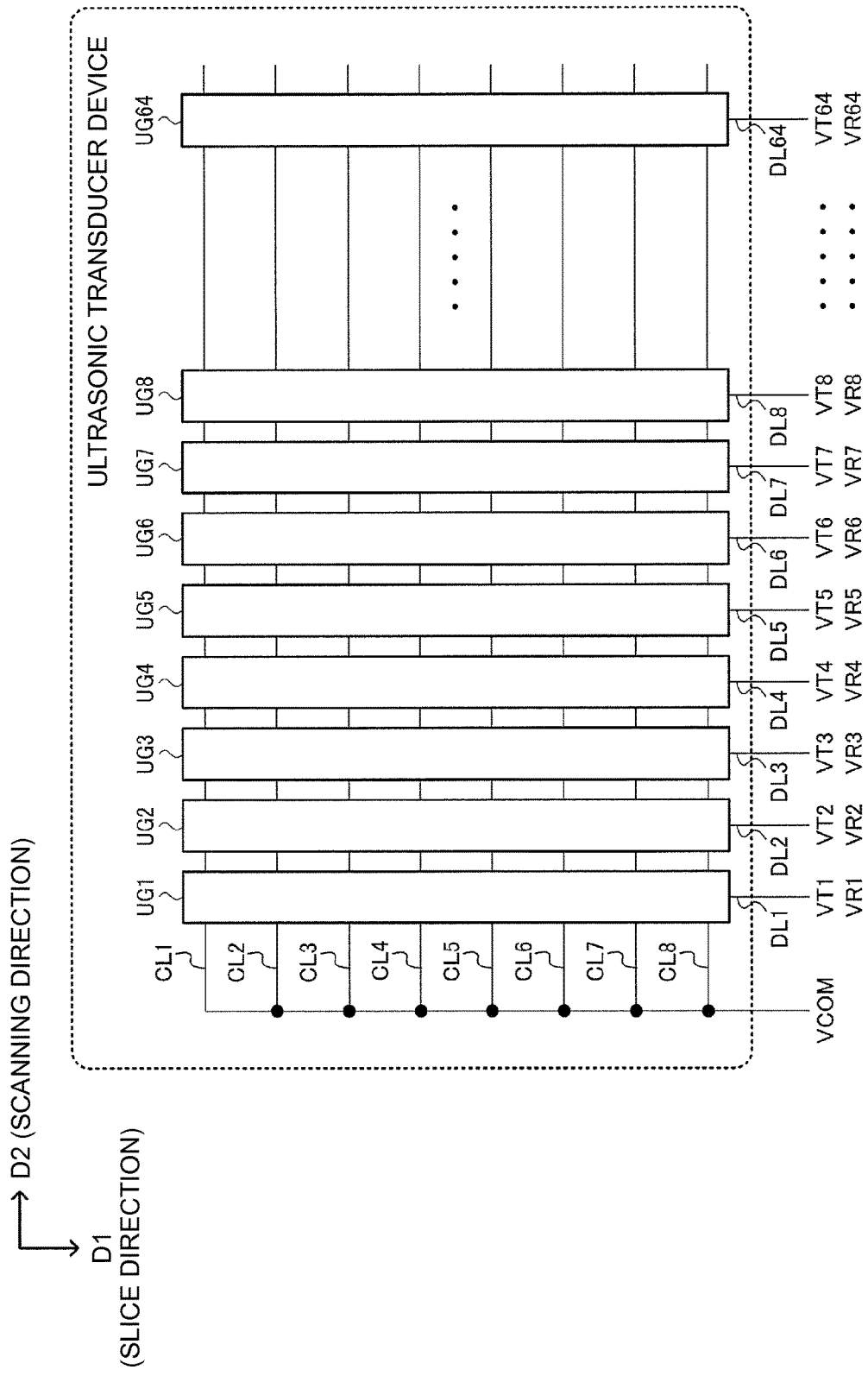
FIG. 13 is a configuration example of an ultrasonic transducer device.

FIG. 13 illustrates a configuration example of the ultrasonic transducer device (an element chip). The ultrasonic transducer device in this configuration example includes a plurality of ultrasonic transducer element groups UG1 to UG64, drive electrode lines DL1 to DL64 (in a broad sense, first to nth drive electrode lines. The factor n is an integer equal to or greater than 2), and common electrode lines CL1 to CL8 (in a broad sense, the first to mth common electrode lines. The factor m is an integer equal to or greater than 2). The number (n) of the drive electrode lines and the number (m) of the common electrode lines are not limited to the numbers illustrated in FIG. 13.

The plurality of ultrasonic transducer element groups UG1 to UG64 are arranged in 64 columns along a second direction D2 (a scan direction). Each of the ultrasonic transducer element groups UG1 to UG64 has the plurality of ultrasonic transducer elements which are arranged along a first direction D1 (a slice direction).

Figure 14A:
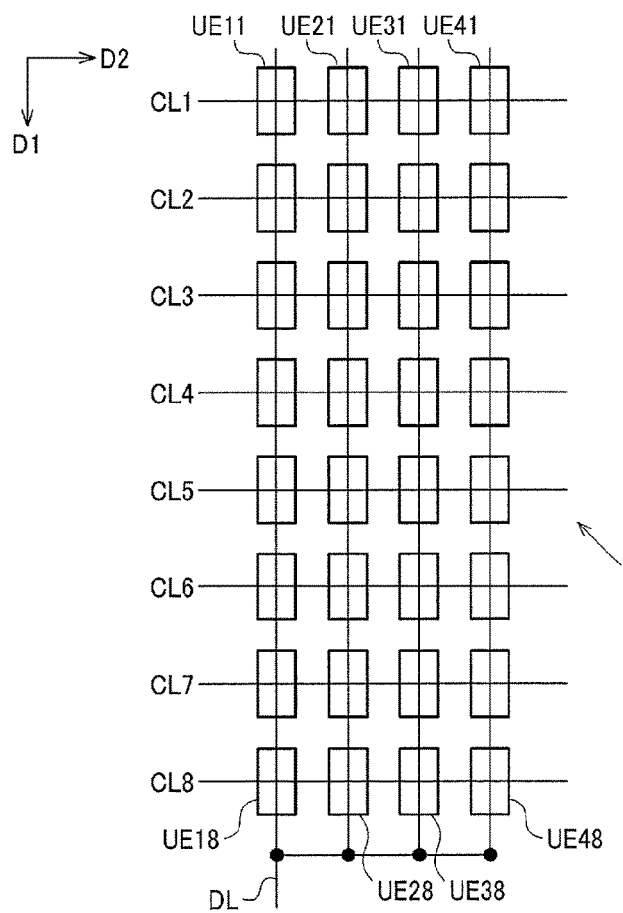
FIGS. 14A and 14B are configuration examples of an ultrasonic transducer element group each of which is provided in response to each of the channels.

FIG. 14A illustrates an example of the ultrasonic transducer element group UG (UG1 to UG64). In FIG. 14A, the ultrasonic transducer element group UG is configured to have first to fourth element columns. The first element column is configured to have ultrasonic transducer elements UE11 to UE18 which are arranged along the first direction D1, and the second element column is configured to have ultrasonic transducer elements UE21 to UE28 which are arranged along the first direction D1. The third element column (UE31 to UE38) and the fourth element column (UE41 to UE48) are similar thereto as well. The drive electrode lines DL (DL1 to DL64) are commonly connected to the first to fourth element columns, and the common electrode lines CL1 to CL8 are connected to the ultrasonic transducer elements of the first to fourth element columns.

Figure 14B:
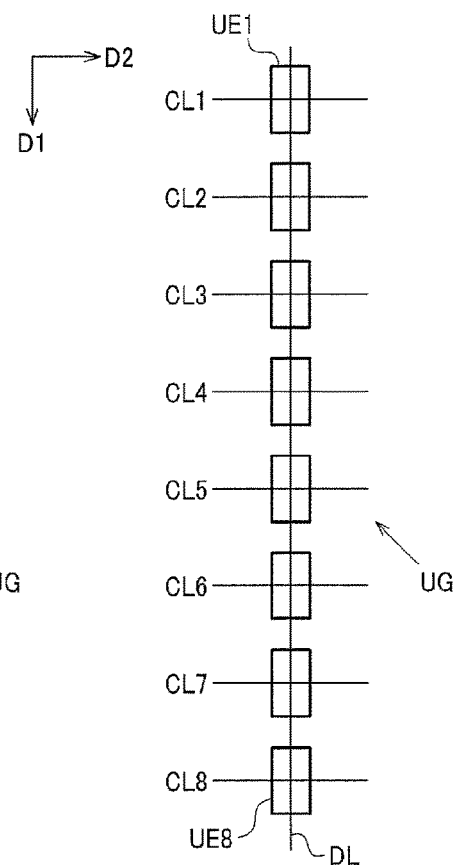

The ultrasonic transducer element group UG in FIG. 14A is configured to be one channel of the ultrasonic transducer device. In other words, the drive electrode line DL corresponds to the drive electrode line in one channel and a transmission signal of one channel from a transmission circuit is input to the drive electrode line DL. A reception signal of one channel from the drive electrode line DL is output from the drive electrode line DL. The number of element columns configuring one channel is not limited to four as described in FIG. 14A. The column may be fewer than four columns or more than four columns. For example, as illustrated in FIG. 14B, the number of the element columns may be one.

As illustrated in FIG. 13, the drive electrode lines DL1 to DL64 (the first to nth drive electrode lines) are wired along the first direction D1. A jth (j is an integer of $1 \leq j \leq n$) drive electrode line DLj (a jth channel) among the drive electrode lines DL1 to DL64 is connected to the first electrode (for example, the lower electrode) included in the ultrasonic transducer element of a jth ultrasonic transducer element group UGj.

During a transmission period in which ultrasonic waves are emitted, transmission signals VT1 to VT64 are supplied to the ultrasonic transducer element via the drive electrode lines DL1 to DL64. During a reception period in which ultrasonic echo signals are received, reception signals VR1 to VR64 are output from the ultrasonic transducer element to the drive electrode lines DL1 to DL64.

The common electrode lines CL1 to CL8 (the first to mth common electrode lines) are wired along the second direction D2. The second electrode included in the ultrasonic transducer element is connected to any one among the common electrode lines CL1 to CL8. Specifically, for example, as illustrated in FIG. 13, an ith (i is an integer of $1 \le i \le m$) common electrode line CLi among the common electrode lines CL1 to CL8 is connected to the second electrode (for example, the upper electrode) included in the ultrasonic transducer element which is arranged in an ith row.

A common voltage VCOM is supplied to the common electrode lines CL1 to CL8. The common voltage VCOM may be a constant direct current voltage and does not need to be 0V, that is, ground potential.

During the transmission period, a differential voltage between the transmission signal voltage and the common voltage is applied to the ultrasonic transducer element, and an ultrasonic wave at a predetermined frequency is emitted.

The arrangement of the ultrasonic transducer elements is not limited to the matrix arrangement illustrated in FIG. 13 and may be a so-called zig-zag arrangement or the like.

FIGS. 14A and 14B illustrate cases where one ultrasonic transducer element serves as both a transmission element and a reception element. However, the embodiment is not limited thereto. For example, the ultrasonic transducer element for a transmission element and the ultrasonic transducer element for a reception element may be separately provided in an array shape.

3. Region Discrimination Processing

Figure 15:
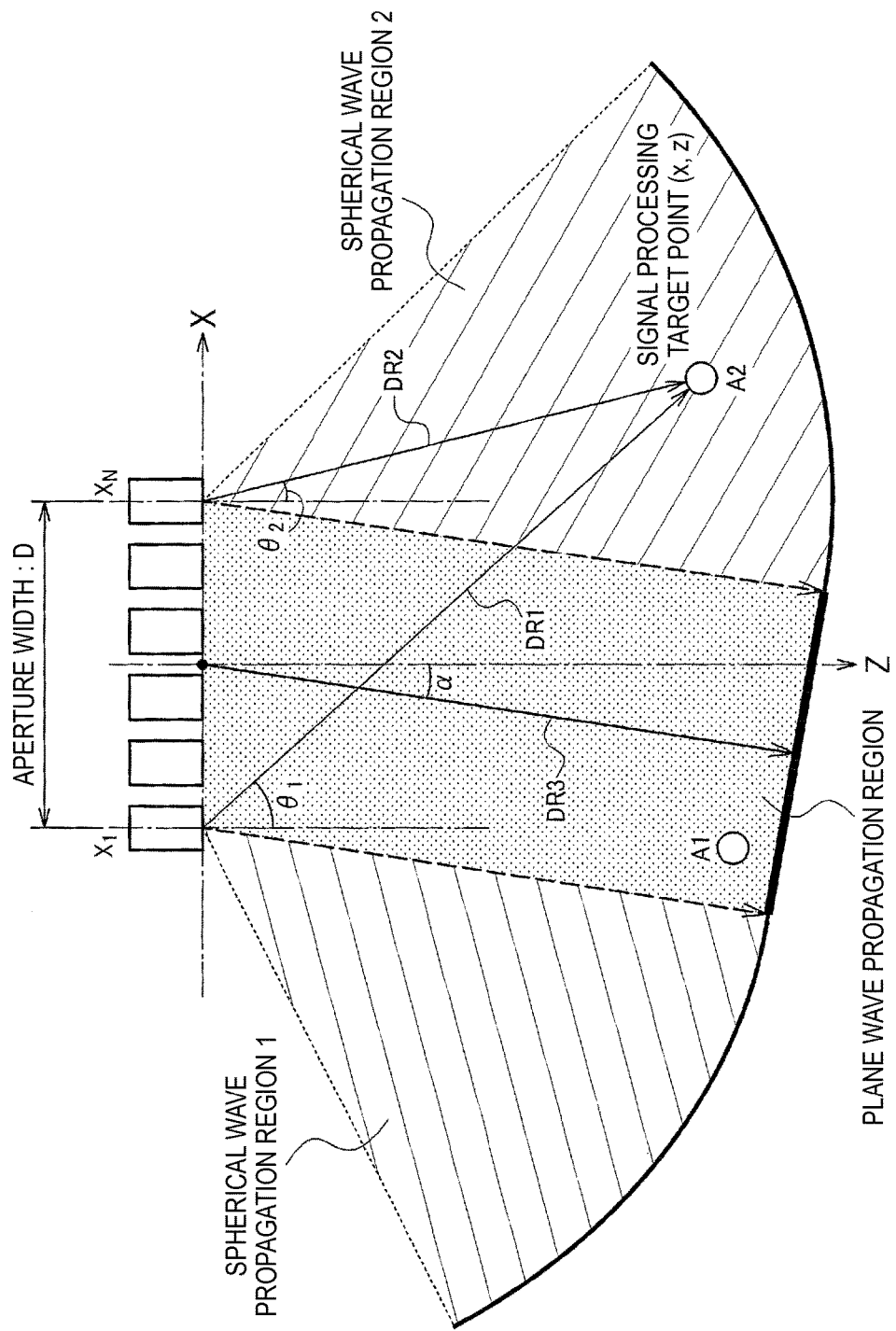
FIG. 15 is an explanatory diagram of a plane wave propagation region and a spherical wave propagation region.

Subsequently, descriptions will be given regarding the region discrimination processing which is performed by the region discrimination processing unit 131 of the processing unit 130. As illustrated in FIG. 15, when a given transmission angle α is decided, a plane wave is transmitted to a region which is decided based on the transmission angle α and the width (the aperture width) of the ultrasonic transducer element array, and the region becomes the plane wave propagation region. The regions outside the plane wave propagation region become the spherical wave propagation region.

In other words, the plane wave propagation region and the spherical wave propagation region are the regions which vary in accordance with the transmission angle of an ultrasonic wave of the transmission processing unit 110. In other words, when the transmission angle α is decided, the plane wave propagation region and the spherical wave propagation region for α can be decided.

Therefore, as illustrated in FIG. 5 and the like, when K values from first to Kth transmission angles can be taken for the transmission angle, it is possible to consider the plane wave propagation regions and the spherical wave propagation regions in the number of K. For example, the first plane wave propagation region and the first spherical wave propagation region corresponding to the first transmission angle are decided, and the second plane wave propagation region and the second spherical wave propagation region corresponding to the second transmission angle are decided.

However, processing contents cannot be fixed with only the plane wave propagation region and the spherical wave propagation region so that the position of the signal processing target point which is the processing target also needs to be considered. For example, it is assumed that the given transmission angle is decided and the plane wave propagation region and the spherical wave propagation region are decided as illustrated in FIG. 15. Also in such a case, if the signal processing target point is at the position indicated by A1 in FIG. 15, the signal processing target point is in the plane wave propagation region. However, if the signal processing target point is at the position indicated by A2, the signal processing target point is in the spherical wave propagation region.

In other words, the processing unit 130 needs to acquire the position of the signal processing target point which is a target desired to be focused on. Thereafter, the processing unit 130 performs the region discrimination processing regarding where the signal processing target point exists in any one of the plane wave propagation region and the spherical wave propagation region.

Specifically, the transmission processing unit 110 may perform processing for transmitting the first to Kth (K is an integer equal to or greater than 2) ultrasonic waves at the first to Kth transmission angles, and the processing unit 130 may perform the region discrimination processing for discriminating where the signal processing target point exists in any one of the ith plane wave propagation region and the ith spherical wave propagation region corresponding to the ith ultrasonic wave, based on the ith (i is an integer of $1 \le i \le K$) transmission angle and the position of the signal processing target point.

In this manner, when one given point is decided for the signal processing target point, the region discrimination processing is performed K times as many as the number of the transmission angles (the number of times of transmissions), thereby acquiring K results of the region discrimination processing. Here, the result of the region discrimination processing denotes information which indicates whether the signal processing target point exists in the plane wave propagation region or exists in the spherical wave propagation region. For example, the information may consist of two values so as to exhibit 1 when existing in the plane wave propagation region and to exhibit 0 when existing in the spherical wave propagation region.

As described above, since the signal processing target point is generally set in multiple numbers, as many the results of the region discrimination processing as M×K which is multiplication of the setting number M of the signal processing target points and the number K of the transmission angles are actually acquired.

Various types of specific technique can be considered for the region discrimination processing when the position of the signal processing target point and the transmission angle are decided. As an example, the processing unit 130 may perform the region discrimination processing based on a first direction DR1 in which a first ultrasonic transducer corresponding to the aperture end among the first to Nth ultrasonic transducers is connected to the signal processing target point r, a second direction DR2 in which the Nth ultrasonic transducer corresponding to the other aperture end among the first to Nth ultrasonic transducers is connected to the signal processing target point r, and the transmission angle α (in a broad sense, the transmission direction DR3) of an ultrasonic wave.

As described above with reference to FIGS. 7 and 15, a boundary between the plane wave propagation region and the spherical wave propagation region is formed by two straight lines L1 and L2 passing through the aperture ends in the same direction as the transmission direction DR3 of the plane wave. In other words, as illustrated in FIG. 16A, the position of the signal processing target point on the line L1 corresponds to the limit line on one side when the signal processing target point is included in the plane wave propagation region, and as illustrated in FIG. 16B, the position of the signal processing target point on the line L2 corresponds to the limit line on the other side when the signal processing target point is included in the plane wave propagation region.

Figure 16A:
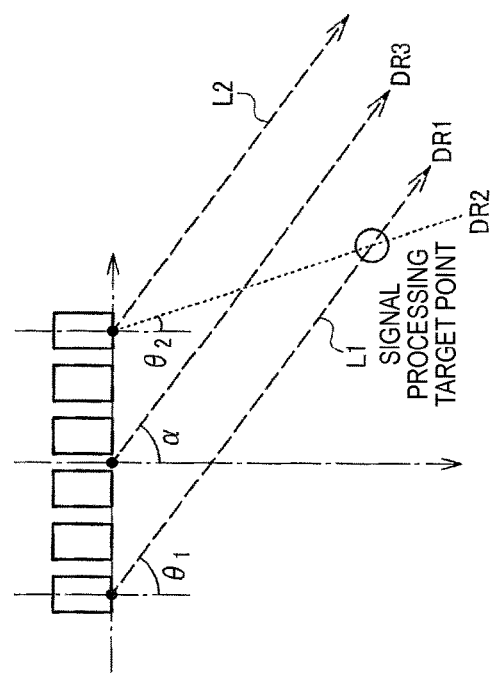
FIGS. 16A to 16C are explanatory diagrams of region discrimination processing.

In FIG. 16A, since the line L1 is a straight line in the direction of DR3 (parallel to DR3), a case where the signal processing target point is on the line L1 denotes that the first direction DR1 in which the first ultrasonic transducer is connected to the signal processing target point r and the transmission direction DR3 of an ultrasonic wave coincide with each other. Similarly, as illustrated in FIG. 16B, a case where the signal processing target point is on the line L2 denotes that the second direction DR2 in which the Nth ultrasonic transducer is connected to the signal processing target point r and the transmission direction DR3 of an ultrasonic wave coincide with each other. In other words, the region discrimination processing can be performed by determining a relationship between DR1 and DR3, and a relationship between DR2 and DR3.

Various types of technique can be considered for comparison processing as well. For example, the comparison processing may be performed regarding the degree of an angle with respect to a given standard direction. When a direction perpendicular to the element array (a depth direction z) is set as the standard direction, as illustrated in FIG. 15, it is possible to define the angle θ1 corresponding to DR1, the angle θ2 corresponding to DR2, and the angle α corresponding to DR3.

Figure 16B:
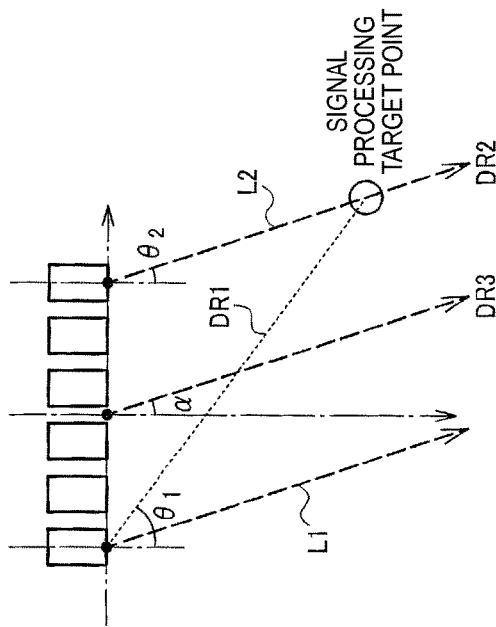
Figure 16C:
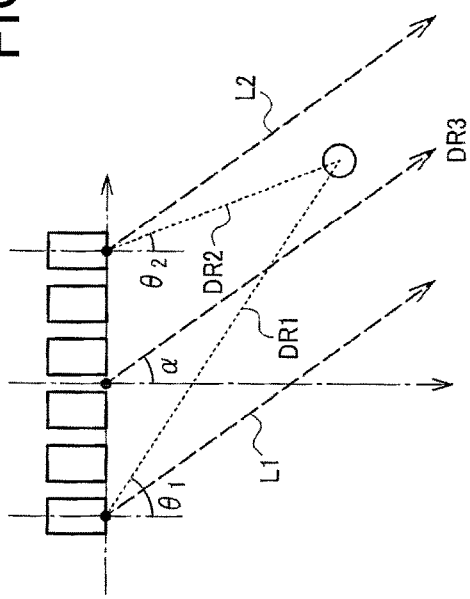

In the circumstances as illustrated in FIG. 16A, there is a relationship of θ1=α, and in the circumstances as illustrated in FIG. 16B, there is a relationship of θ2=α. Then, as illustrated in FIG. 16C, in the circumstances where the signal processing target point is in the plane wave propagation region, α becomes a value between θ1 and θ2. In an example having a relationship of θ1>θ2 as that in the example of FIG. 16C, there exists a relationship of θ2<α<θ1. In other words, in the examples of FIGS. 16A to 16C, it may be determined that the signal processing target point is in the plane wave propagation region when the relationship of θ2≤α≤θ1 is satisfied, and it may be determined that the signal processing target point is in the spherical wave propagation region when there is a relationship of α<θ2 or θ1<α.

Even though specific determination expression varies in accordance with a method of setting the standard direction or the condition of a relationship of magnitude between θ1 and θ2, it is possible to perform the region discrimination processing based on a relationship among DR1, DR2, and DR3 as described above.

In the embodiment, the region discrimination processing may be performed for each round of the processing timing by using the above-described expressions and the like. However, the embodiment is not limited thereto. For example, there are one or multiple types of the ultrasonic probe 200, and it is assumed that the type is possibly specified to be in a small number. In other words, since it is possible to know the configuration of the ultrasonic transducer element array in advance, it is also possible to know the positions of the aperture ends. In addition, even though various modifications can be executed regarding the degree of the range of the transmission angle and the degree of the variable width of the angle used in the scanning, the scanning is supposed to be limited to a certain pattern. Therefore, it is also possible to know the transmission angle α in advance. When the size and the like of an ultrasonic image to be acquired are taken into consideration, it is also possible to specify the setting (the number of the signal processing target points, the position, and the like) of the signal processing target point desired to be focused on in advance.

As described above, as the signal processing target point, the angle, and the positions of the aperture ends are decided, the region discrimination processing is ready to be performed. Therefore, it is possible to acquire all thereof in advance. In this case, the determination may be performed in advance and only the result thereof may be retained as the table data, without acquiring the result by performing the determination using the above-described expressions and the like for each time.

In other words, the ultrasonic measurement apparatus 100 may additionally include a storage unit (not illustrated in FIG. 9 and the like) which stores the table data in which information indicating where the signal processing target point exists in any one of the plane wave propagation region and the spherical wave propagation region corresponds to the given signal processing target point in each transmission angle among the plurality of transmission angles of an ultrasonic wave from the transmission processing unit 110. The processing unit 130 may perform the region discrimination processing based on the table data.

In this manner, there is no need to perform specific computation and the like every time, and the region discrimination processing can be realized with reference to the table data. Therefore, it is possible to reduce a burden to the processing and to speed up the region discrimination processing.

FIGS. 17A and 17B illustrate examples of the table data. As described above, in order to decide the existence in any one of the plane wave propagation region and the spherical wave propagation region, the signal processing target point r and the transmission angle α need to be decided. In FIG. 17A, any one between the information indicating the existence in the plane wave propagation region (in FIG. 17A, data of "1") and the information indicating the existence in the spherical wave propagation region (in FIG. 17A, data of "0") corresponds to each of the K transmission angles, with respect to the one given signal processing target point $r_p$. Accordingly, when the plurality (M) of signal processing target points are set, M items of the table data are retained as illustrated in FIG. 17A, or the table data having M×K items of information is used as illustrated in FIG. 17B.

Furthermore, when the ultrasonic probe 200 is replaceable and a plurality of the ultrasonic probes 200 having the aperture widths different from one another are possibly connected thereto, the result of the region discrimination processing varies in accordance with the aperture width. Therefore, there is a need to retain the table data corresponding to each aperture width. For example, the table data illustrated in FIG. 17B may be retained as many as the assumed types of the ultrasonic probe 200.

Otherwise, only a portion of the table data, for example, the table data assumed to be frequently used such as the aperture width, the signal processing target point, and the transmission angle may be retained instead of retaining all the table data. In this case, the region discrimination processing may be performed by using the table data in circumstances where the aperture width, the signal processing target point, and the transmission angle corresponding to the table data are used, and in other circumstances, the region discrimination processing may be performed every time by using the above-described determination expressions and the like. Otherwise, when the region discrimination processing is performed by using the above-described determination expressions and the like, the result of the discrimination processing may be retained as the table data. In this case, for example, when processing using the same aperture width, signal processing target point, and transmission angle is performed twice or more, the region discrimination processing is performed by using the determination expressions and the like in the first processing and the result thereof is retained as the table data, and the region discrimination processing is performed by using the table data after the second time.

4. Details of Processing

In the region discrimination processing described above, it is possible to discriminate where the signal processing target point which is the processing target exists in any one of the plane wave propagation region and the spherical wave propagation region. Therefore, the phasing processing unit 132 performs the first phasing processing which is processing for a plane wave when it is determined to exist in the plane wave propagation region, and performs the second phasing processing which is processing for a spherical wave when it is determined to exist in the spherical wave propagation region.

Specifically, the first phasing processing is the phasing processing performed based on the propagation time of the plane wave which is obtained through the plane wave propagation model, and the second phasing processing is the phasing processing performed based on the propagation time of the spherical wave which is obtained through the spherical wave propagation model.

As described below with reference to FIGS. 19A to 20, it is possible to consider two types of the spherical wave propagation model such as a transmission wave model and a reflected wave (a reception wave) model. However, herein in a narrow sense, the spherical wave propagation model indicates the transmission wave model. The propagation time of the plane wave is a transmission propagation time $t_{emt}$ of the plane wave which is obtained through the following Expression 3. However, the propagation time thereof may be $t_{emt}$ and the propagation time which is obtained through the following Expression 1 (the total propagation time). Similarly, the propagation time of the spherical wave is the transmission propagation time $t_{emt}$ of the spherical wave which is obtained through the following Expression 7. However, the propagation time thereof may be $t_{emt}$ and the propagation time which is obtained through the following Expression 1.

As described above with reference to FIGS. 1A and 1B, even though a reflected wave (an ultrasonic echo) is reflected from one signal processing target point, since the propagation path R varies in accordance with the position and the like of the element, the receiving timing of the reflected wave varies. The phasing processing is processing for reducing (in a narrow sense, eliminating) deviation of the timing thereof, that is, deviation of the phase in waveforms, as illustrated in FIG. 3. In other words, if it is possible to specify at which timing the reflected wave from the signal processing target point which is the processing target in each of the elements is acquired, the phasing processing can be performed. Specifically, the time taken by a wave emitted from the element array for being propagated to the signal processing target point and the time taken for being propagated from the signal processing target point to each of the elements may be specified. Specifically, the propagation time $t_{ToF}$ is obtained through the following Expression 1, and the signal at the timing corresponding to the propagation time $t_{ToF}$ is sampled among the reception signals s.

$$t_{ToF}=t_{emt}+t_{rev} \quad (1)$$

In the above Expression 1, the factor $t_{emt}$ represents the transmission propagation time which is the time taken by the transmission wave emitted from the element array for being propagated to the signal processing target point, and the factor $t_{rev}$ represents the reception propagation time which is rev the time taken by the reflected wave (the reception wave) for being propagated from the signal processing target point to each of the elements.

The factors $t_{emt}$ and $t_{rev}$ can be obtained by using a geometric model of wave propagation. Among thereof, in regard to $t_{emt}$, the using geometric model needs to vary in accordance with whether the signal processing target point exists in the plane wave propagation region or exists in the spherical wave propagation region. When the signal processing target point exists in the plane wave propagation region, the plane wave propagation model which is the geometric model indicating how the plane wave is propagated is used, and when the signal processing target point exists in the spherical wave propagation region, the spherical wave propagation model which is the geometric model indicating how the spherical wave is propagated is used. Regardless of whether the transmission wave is the plane wave or the spherical wave, the reflected wave of the transmission wave which is reflected from the signal processing target point may be considered to be propagated as the spherical wave having the signal processing target point as a point wave source. In other words, in regard to $t_{rev}$, the spherical wave propagation model may be used regardless of the result of the region discrimination processing.

Hereinafter, an example of obtaining $t_{emt}$ by the plane wave propagation model, an example of obtaining $t_{emt}$ by the spherical wave propagation model, and an example of obtaining $t_{rev}$ by the spherical wave propagation model will be individually described. Hereinafter, while being on the condition of the time t=0, it is defined that a wave is generated from the position (the center of the element array) of x=0 and z=0.

Figure 18:
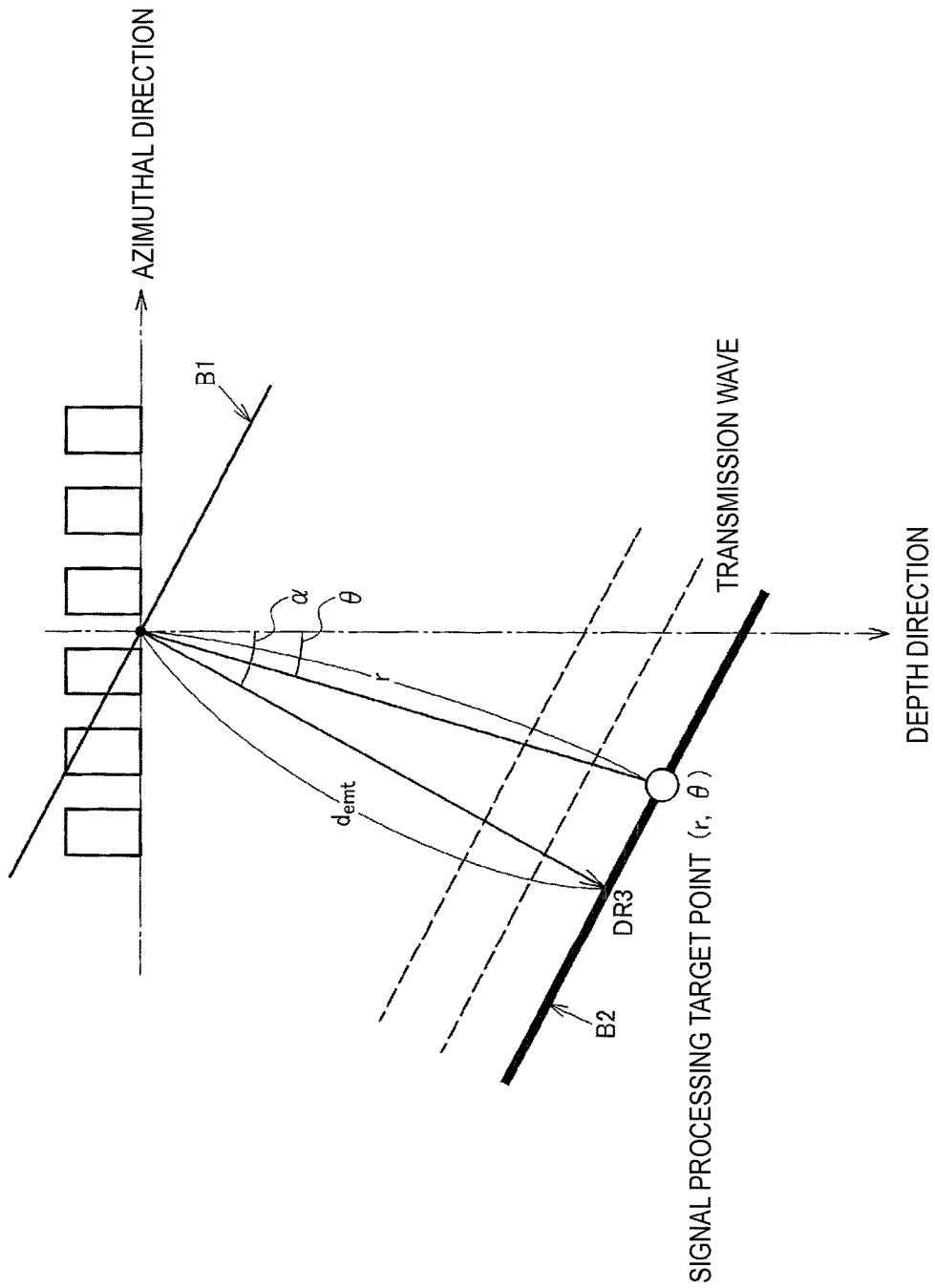
FIG. 18 is an example of a plane wave propagation model.

FIG. 18 illustrates an example of the plane wave propagation model. In the plane wave, the wave surfaces in the same phase become line segments perpendicular to the transmission direction DR3, and the line segments move in the direction of DR3 due to a speed c of the ultrasonic wave. Here, the coordinates of the signal processing target point $r_m$ are set as $r_m=(r, \theta)$ in the polar coordinates. As described above, since a wave is generated from the center of the element array at t=0, the arrival position of the wave at t=0 becomes the line segment indicated by B1 in FIG. 18. Since the signal processing target point $r_m$ is positioned on the line segment at the timing when the plane wave arrives at the signal processing target point $r_m$, the arrival position of the wave at the aforementioned timing becomes the line segment indicated by B2 in FIG. 18. In other words, when the plane wave arrives at the given signal processing target point $r_m$, the plane wave is propagated as far as a transmission wave propagation distance indicated by $d_{emt}$.

Here, since the coordinates of $r_m$ is $(r, \theta)$, and the transmission angle is $\alpha$, the transmission wave propagation distance $d_{emt}$ can be obtained through the following Expression 2. When the speed c of the ultrasonic wave is used, the transmission propagation time $t_{emt}$ in such a case is obtained by the following Expression 3.

$$d_{emt}=r\cos(\alpha-\theta) \quad (2)$$

$$t_{emt}=d_{emt}/c \quad (3)$$

Figure 19A:
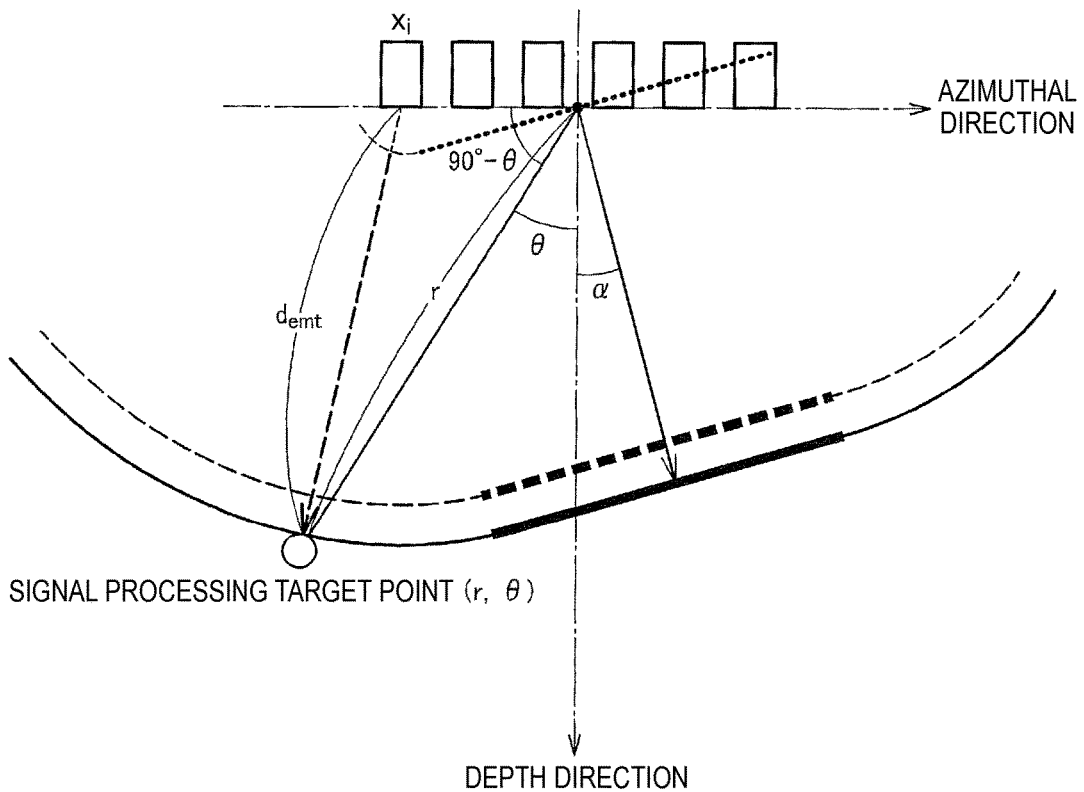
FIGS. 19A and 19B are examples of a spherical wave propagation model.

Subsequently, FIG. 19A illustrates the spherical wave propagation model for the transmission wave. According to the model in FIG. 19A, the spherical wave having the first element or the Nth element as a wave source is propagated in the spherical wave propagation region. In this case, the first element is positioned at the end portion (the aperture end) of the element array and the Nth element is positioned at the end portion on the other side thereof. Waves are also output from other elements included in the element array. However, the waves are mutually cancelled in the spherical wave propagation region so that it is enough to be considered that the intensity is small compared to the wave from the end portion. In other words, in consideration of the spherical wave having the element at the end portion as the wave source, it is possible to obtain sufficiently accurate $t_{emt}$.

Here, when the coordinates of the element at the end portion are $(x_i, 0)$, the spherical wave arrives at the signal processing target point $r_m$ while having $(x_i, 0)$ as the wave source. Accordingly, the transmission wave propagation distance $d_{emt}$ in such a case can be obtained through the following Expression 4 by applying the cosine theorem as illustrated in FIG. 19A.

$$d_{emt} = \sqrt{r^2 + x_i^2 - 2rx_i \sin\theta} \quad (4)$$

It is possible to obtain the time taken by the spherical wave output from $(x_i, 0)$ for arriving at the signal processing target point $r_m$ by dividing $d_{emt}$ by the speed c. However, herein, a wave is generated from the center of the element array at t=0 as described above. Since the transmission processing unit 110 performs processing for outputting the plane wave at the transmission angle α, the arrival position of the plane wave at t=0 is in a state of the line segment indicated by C1 in FIG. 19B. In order to realize the wave surface indicated by C1, the element at the end portion needs to start driving at the timing prior to t=0. Specifically, in the element array, the element on the left side from the center in FIG. 19B needs to be driven at the timing prior to t=0, and the element on the right side from the center needs to be driven at the timing later than t=0. In other words, in order for the transmission angle α to take an angle other than zero degrees, the drive timing of each of the elements needs to vary in accordance with the transmission angle. In other words, since the element at the end portion is driven at the timing different from t=0 excluding a case of α=0, $t_{emt}$ cannot be simply obtained by dividing the above Expression 4 by the speed c. Therefore, an offset time $t_{offset}$ indicating deviation of the timing has to be reflected therein.

Figure 19B:
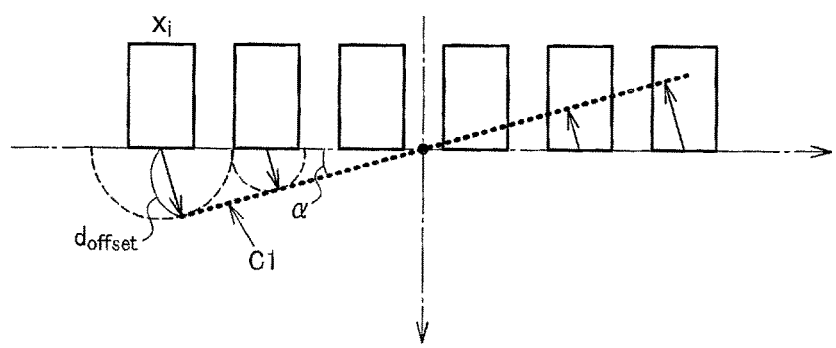

In order to realize the wave surface indicated by C1 in FIG. 19B, the wave output from the element at the end portion has to be propagated by the distance indicated by $d_{offset}$ as illustrated in FIG. 19B at the stage of t=0. Since the distance $d_{offset}$ can be obtained through the following Expression 5, the offset time is obtained through the following Expression 6.

$$d_{offset} = x_i \sin\alpha \quad (5)$$

$$t_{offset} = d_{offset}/c \quad (6)$$

The transmission propagation time $t_{emt}$ in a case where the spherical wave propagation model is used by applying the results of the above Expressions 4 and 6 can be obtained through the following Expression 7. In FIG. 19B and the like, since the right direction of the drawing is considered as the x-axis forward direction, $d_{offset}$ and $t_{offset}$ obtained through the above Expressions 5 and 6 are negative values. Accordingly, the transmission propagation time $t_{emt}$ is lessened by adding $t_{offset}$ in the following Expression 7.

$$t_{emt} = d_{emt}/c + t_{offset} \quad (7)$$

Figure 20:
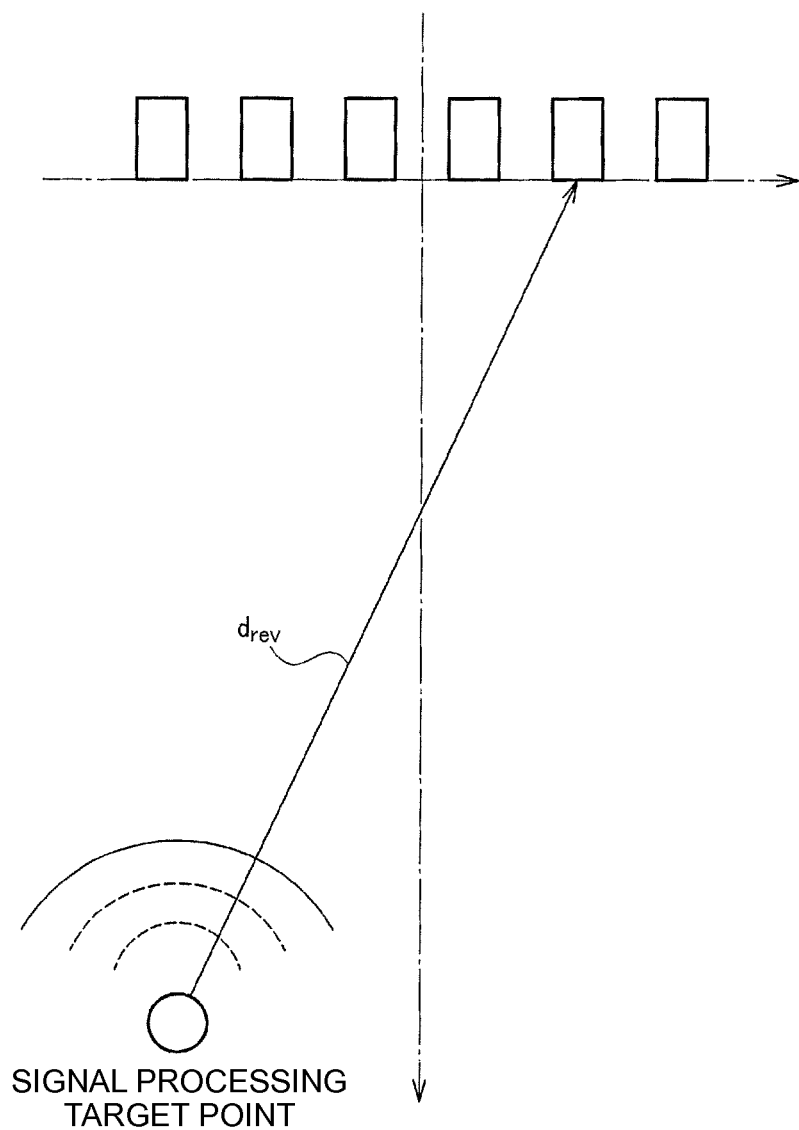
FIG. 20 is an example of a propagation model indicating propagation of the reflected wave (a reception wave).

FIG. 20 illustrates the spherical wave propagation model of the reflected wave (the reception wave). As described above, the spherical wave may be considered for the reflected wave having the signal processing target point as the point wave source. Therefore, the signal processing target point and the straight line distance of the target element may be considered for the reception propagation distance $d_{rev}$. When the values of the coordinates of the element are ascertained, the calculation can be easily performed. In regard to the reception propagation time $t_{rev}$ as well, the obtained $d_{rev}$ may rev be divided by the speed c.

According to the processing described above, the phase difference (the delay time) of each of the elements is obtained. For example, when focusing on the given signal processing target point and the given transmission angle, the first to Nth reception signals $s_1$ to $s_N$ corresponding to the first to Nth ultrasonic transducers are received, and the N delay times $t_{ToF}$ corresponding to each thereof are obtained. The processing unit 130 synthesizes the first to Nth reception signals which are obtained after phasing processing and generates a synthetic image in which focusing is set on the signal processing target point.

Specifically, the processing unit 130 performs the phasing processing of the first to Nth reception signals corresponding to the ith (i is an integer of 1≤i≤K) ultrasonic wave based on a result of the ith step of the region discrimination processing, synthesizes the first to Nth reception signals which are obtained after the phasing processing, and generates an ith synthetic signal which is set to focus on the signal processing target point while having first resolution. The above processing corresponds to the synthesizing processing performed in the transverse direction of FIG. 6 and may be performed by the first resolution signal synthesis unit 134. The processing unit 130 synthesizes the first to Nth synthetic signals of the first resolution, and the signal processing target point is set to be focused on, thereby generating an output signal of the second resolution having higher resolution compared to the first resolution. The above processing corresponds to the synthesizing processing performed in the vertical direction of FIG. 6 and may be performed by the second resolution signal synthesis unit 136.

The aforementioned flow will be described with reference to expressions. The following Expression (8) represents the synthesizing processing performed after the phasing processing and the phasing processing described above. In the following Expression (8), the factor $s'(r_p)$ is a signal value (an output signal) in a signal processing target point $r_p$, and the factor $r_p$ is a vector indicating the position of the signal processing target point. The factor K is the total number of times of transmissions of a transmission wave. The factor N is the number of the elements. The factor k is a transmission number. The factor n indicates a reception element number. The factor $a_n$ is a window function in apodization, and specifically, is the above-described first beamforming coefficient. The factor $a_k$ is also a window function in apodization but, specifically, is the above-described second beamforming coefficient. The factor $S_{k,n}$ indicates a reception signal in the nth element corresponding to the kth transmission wave. The above-described signals $s_1$ to $s_N$ correspond to $s_{k,n}$ when n=1 to N in a case where the transmission wave is specified as one given wave.

$$s'(r_p) = \sum_{k=1}^{K} \sum_{n=1}^{N} a_k a_n s_{k,n}(t_{ToF}(r_p, k, n)) \quad (8)$$

In the above Expression 8, the factor $t_{ToF}(r_p, k, n)$ is a function for calculating a propagation time (the delay time) and is actually corresponds to the region discrimination processing and the calculation processing for the propagation time performed based on the result of the region discrimination processing. The output of the function becomes the time (the sampling timing and the sampling number) of a signal corresponding to the signal processing target point $r_p$ which is obtained through the kth transmission among reception signals $s_{k,n}$ of the element n.

The signal $s_{k,n}(t_{ToF})$ is a function for executing the phasing processing, and a signal value of a desired sampling number is sampled from the reception signals $s_{k,n}$.

When the factor $L(r_p)$ is defined through the following Expression 9, $L(r_p)$ corresponds to reception focus processing.

$$L(r_p) = \sum_{n=1}^{N} a_n s_{k,n}. \tag{9}$$

Specifically, the above-described expression is the processing for synthesizing the first resolution signal which is focused on the signal processing target point represented by $r_p$. Since when the signal processing target point $r_p$ is changed, the first resolution signal is obtained throughout the overall region of the observation region, and imaging is performed, only a reception focus is obtained and an image of which the transmission focus cannot be obtained is obtained, the first resolution signal is a low-resolution signal having resolution lower than that of the below-described second resolution signal. It is because since the transmission angle is one given angle in a stage where $L(r_p)$ is obtained, it is not possible to perform the processing for selecting a transmission wave which is in focus at the time of transmission with respect to a particular signal processing target point among the plurality of transmission angles. In other words, it is not possible to obtain a transmission focus in regard to the point where signals of the plurality of transmission angles are not synthesized. The first beamforming coefficient $a_n$ is set as 1 in all the examples throughout the descriptions given with reference to FIG. 4 and the like. However, a general apodization window function such as boxcar and hanning may be applied, or the adaptive-type weight which can be obtained through the adaptive beamforming may be applied.

Meanwhile, when $L(r_p)$ is defined as above, the above Expression 8 can be modified as the following Expression 10.

$$s'(r_p) = \sum_{k=1}^{K} a_k L(r_p) \tag{10}$$

As is shown by the above Expression 10, the factor $s'(r_p)$ is a signal which is obtained by synthesizing the first resolution signal using the second beamforming coefficient and is the second resolution signal which is in focus for transmission and reception with respect to the signal processing target point $r_p$. Since when the signal processing target point $r_p$ is changed, the second resolution signal is obtained throughout the overall region of the observation region, and imaging is performed, a reception focus and a transmission focus can be obtained throughout the overall region of an image, the second resolution signal is a high-resolution signal having higher resolution compared to the first resolution signal. It is because the signals of the plurality of transmission angles are synthesized for $s'(r_p)$ being different from $L(r_p)$. The second beamforming coefficient $a_k$ is also set as 1 in all the examples throughout the above descriptions. However, a general apodization window function such as boxcar and hanning may be applied, or the adaptive-type weight which can be obtained through the adaptive beamforming may be applied.

Figure 21:
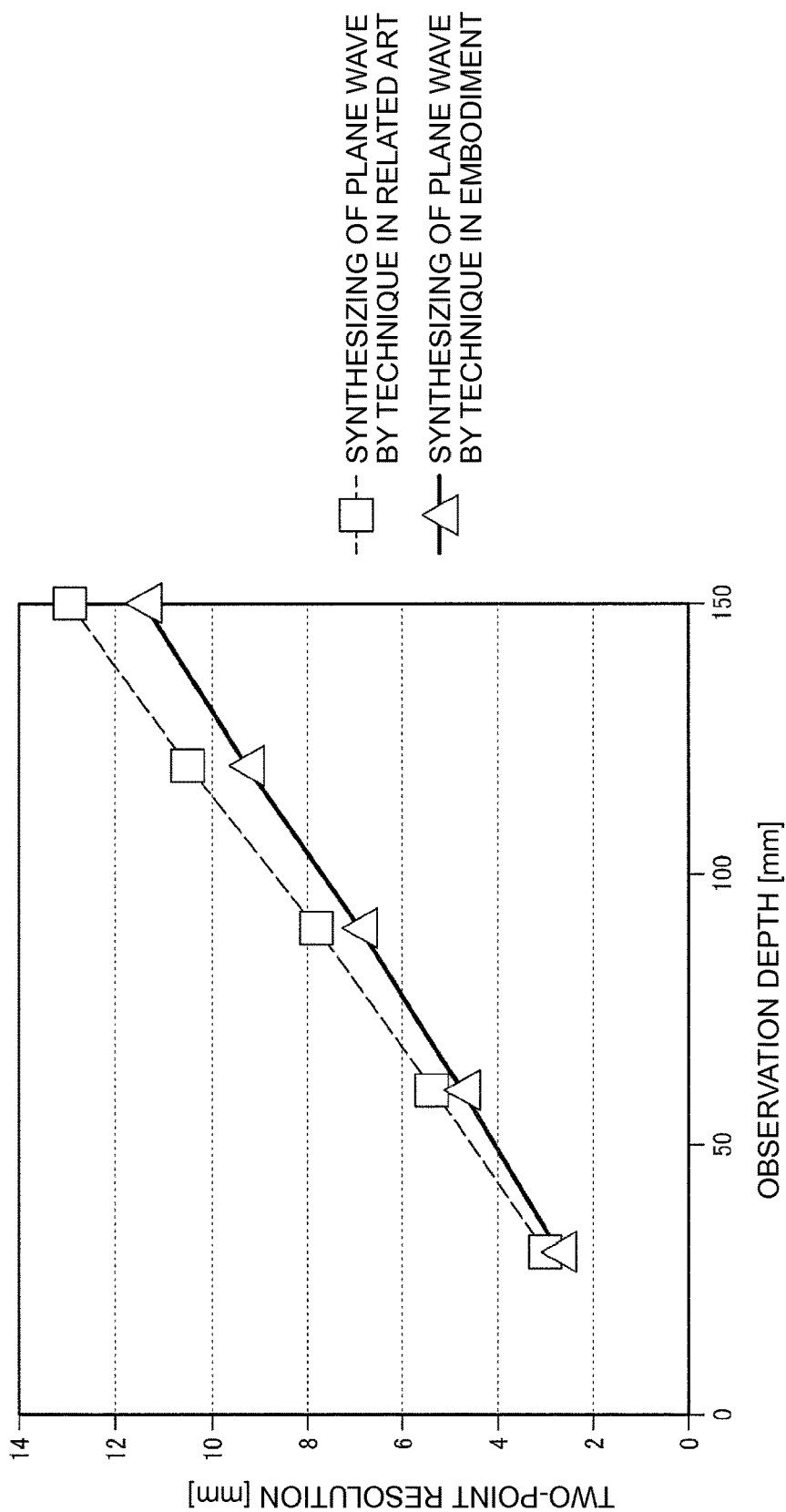
FIG. 21 is a graph illustrating results of evaluation regarding resolution obtained by technique in the related art and technique of the embodiment.

FIG. 21 illustrates two-point resolution in a case where synthesizing of the plane wave is performed by the technique in the related art and a case where synthesizing of the plane wave is performed by the technique of the embodiment. Herein, the two-point resolution is a numerical value indicating whether or not the points are distinguishable when two different points are away from each other to the extent of a certain distance. As the value becomes smaller, it is possible to distinguish the points closer to each other, and thus, resolution is enhanced.

As is clear from FIG. 21, in all five observation depths set therein, it has been found out that resolution is improved further by the technique of the embodiment compared to the technique in the related art. In other words, it is possible to prevent reduction of the aperture width effective for transmission which has been a disadvantage in the technique in the related art, by using the technique of the embodiment, and thus, it is possible to improve resolution of an image.

Hereinbefore, the embodiment is described in detail. However, it is possible for those skilled in the art to easily understand that new additions and various modifications without substantially departing from the invention can be made. Therefore, all the modification examples are considered to be included in the scope of the invention. For example, a term which has been disclosed at least once together with alternative term used in a wider sense or similar sense in this Specification and the drawings can be replaced with the alternative term at any place in this Specification and the drawings. The configurations and operations of the ultrasonic measurement apparatus, the ultrasonic diagnostic apparatus, and the like are not also limited to those described in the embodiment. Therefore, various modifications can be executed.

The entire disclosure of Japanese Patent Application No. 2014-221047 filed on Oct. 30, 2014 is expressly incorporated by reference herein.

What is claimed is:

1. An ultrasonic measurement apparatus comprising:
   a transmission processing unit that performs processing for transmitting an ultrasonic wave at a given transmission angle;
   a reception processing unit that performs reception processing of an ultrasonic echo with respect to the transmitted ultrasonic wave in first to Nth (N is an integer equal to or greater than 2) ultrasonic transducers; and
   a processing unit that performs processing with respect to first to Nth reception signals corresponding to the first to Nth ultrasonic transducers,
   wherein the processing unit performs phasing processing with respect to each of the reception signals of the first to Nth reception signals, such as first phasing processing performed when a signal processing target point exists in a plane wave propagation region in which the ultrasonic wave is propagated as a plane wave, and second phasing processing performed when the signal processing target point exists in a spherical wave propagation region in which the ultrasonic wave is propagated as a spherical wave.

2. The ultrasonic measurement apparatus according to claim 1,
wherein the plane wave propagation region and the spherical wave propagation region are regions different from each other in accordance with the transmission angle of the ultrasonic wave in the transmission processing unit.

3. The ultrasonic measurement apparatus according to claim 1,
wherein the first phasing processing is phasing processing performed for a plane wave propagation time which is obtained by a plane wave propagation model, and
wherein the second phasing processing is phasing processing performed for a spherical wave propagation time which is obtained by a spherical wave propagation model.

4. The ultrasonic measurement apparatus according to claim 1,
wherein the processing unit performs region discrimination processing regarding where the signal processing target point exists in any one of the plane wave propagation region and the spherical wave propagation region.

5. The ultrasonic measurement apparatus according to claim 4, further comprising:
a storage unit that stores table data in which information indicating where the signal processing target point exists in any one of the plane wave propagation region and the spherical wave propagation region is caused to correspond to the given signal processing target point for each transmission angle of a plurality of the transmission angles of the ultrasonic wave from the transmission processing unit,
wherein the processing unit performs the region discrimination processing based on the table data.

6. The ultrasonic measurement apparatus according to claim 4,
wherein the processing unit performs the region discrimination processing based on a first direction in which the first ultrasonic transducer corresponding to an aperture end among the first to Nth ultrasonic transducers is connected to the signal processing target point, a second direction in which the Nth ultrasonic transducer corresponding to the other aperture end among the first to Nth ultrasonic transducers is connected to the signal processing target point, and the transmission angle of the ultrasonic wave.

7. The ultrasonic measurement apparatus according to claim 4,
wherein the transmission processing unit performs processing for transmitting first to Kth (K is an integer equal to or greater than 2) ultrasonic waves at first to Kth transmission angles, and
wherein the processing unit performs the region discrimination processing for discriminating where the signal processing target point exists in any one of an ith (i is an integer of 1≤i≤K) plane wave propagation region and an ith spherical wave propagation region corresponding to an ith ultrasonic wave based on an ith transmission angle and a position of the signal processing target point.

8. The ultrasonic measurement apparatus according to claim 7,
wherein the processing unit performs the phasing processing of the first to Nth reception signals corresponding to the ith ultrasonic wave based on a result of the ith step of the region discrimination processing, synthesizes the first to Nth reception signals which are obtained after the phasing processing, and generates an ith synthetic signal which is set to focus on the signal processing target point while having first resolution, and
wherein the processing unit synthesizes first to Nth synthetic signals having the first resolution, and generates an output signal which is set to focus on the signal processing target point and has second resolution that is resolution higher than the first resolution.

9. The ultrasonic measurement apparatus according to claim 1,
wherein the processing unit synthesizes the first to Nth reception signals which are obtained after the phasing processing and generates a synthetic image in which focusing is set on the signal processing target point.

10. An ultrasonic diagnostic apparatus comprising:
the ultrasonic measurement apparatus according to claim 1.

11. An ultrasonic diagnostic apparatus comprising:
the ultrasonic measurement apparatus according to claim 2.

12. An ultrasonic diagnostic apparatus comprising:
the ultrasonic measurement apparatus according to claim 3.

13. An ultrasonic diagnostic apparatus comprising:
the ultrasonic measurement apparatus according to claim 4.

14. An ultrasonic diagnostic apparatus comprising:
the ultrasonic measurement apparatus according to claim 5.

15. An ultrasonic diagnostic apparatus comprising:
the ultrasonic measurement apparatus according to claim 6.

16. An ultrasonic diagnostic apparatus comprising:
the ultrasonic measurement apparatus according to claim 7.

17. An ultrasonic diagnostic apparatus comprising:
the ultrasonic measurement apparatus according to claim 8.

18. An ultrasonic diagnostic apparatus comprising:
the ultrasonic measurement apparatus according to claim 9.

19. An ultrasonic measurement method comprising:
transmitting an ultrasonic wave at a given transmission angle;
receiving first to Nth (N is an integer equal to or greater than 2) reception signals of an ultrasonic echo performed with respect to the transmitted ultrasonic wave in first to Nth ultrasonic transducers; and
performing, as phasing processing with respect to each of the reception signals of the first to Nth reception signals, first phasing processing when a signal processing target point exists in a plane wave propagation region in which the ultrasonic wave is propagated as a plane wave, and second phasing processing when the signal processing target point exists in a spherical wave propagation region in which the ultrasonic wave is propagated as a spherical wave.

* * * * *